(12) United States Patent
Therrien et al.

(10) Patent No.: US 11,928,744 B1
(45) Date of Patent: Mar. 12, 2024

(54) NEXUS NOTIFICATION PLATFORM

(71) Applicant: Avalara, Inc., Seattle, WA (US)

(72) Inventors: Seth Therrien, Seattle, WA (US);
Jonathan Parramore, Seattle, WA (US); Sujoy Paul, Redmond, WA (US);
Trevor Thomas, Seattle, WA (US);
Kelly Woznicki, Seattle, WA (US);
Jacob Wallace Bixby, Seattle, WA (US); Kevin Robert Halverson,
Seattle, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

(21) Appl. No.: 16/585,829

(22) Filed: Sep. 27, 2019

Related U.S. Application Data

(60) Provisional application No. 62/831,179, filed on Apr. 8, 2019.

(51) Int. Cl.
*G06Q 40/00* (2023.01)
*G06Q 40/10* (2023.01)

(52) U.S. Cl.
CPC .................................... *G06Q 40/10* (2013.01)

(58) Field of Classification Search
CPC .............................. G06Q 40/10; G06Q 40/00
See application file for complete search history.

(56) References Cited

U.S. PATENT DOCUMENTS

| | | |
|---|---|---|
| 5,335,169 A | 8/1994 | Chong |
| 6,236,365 B1 | 5/2001 | Leblanc et al. |
| 6,993,502 B1 | 1/2006 | Gryglewicz et al. |
| 7,200,569 B2 | 4/2007 | Gallagher et al. |
| 7,257,553 B1 | 8/2007 | Baker |
| 7,337,910 B2 | 3/2008 | Cartmell et al. |
| 7,516,242 B2 | 4/2009 | Furukawa et al. |

(Continued)

FOREIGN PATENT DOCUMENTS

WO    2013/163625 A1    10/2013

OTHER PUBLICATIONS

"Sales and Transactions Checker for Economic Nexus," TaxJar, Feb. 19, 2019, https://www.taxjar.com/sales-and-transactions-checker/, 8 pages.

(Continued)

*Primary Examiner* — Ojo O Oyebisi
(74) *Attorney, Agent, or Firm* — Jeremiah J. Bauanch; VLP Law Group LLP

(57) ABSTRACT

A service engine determines whether there is a potential lack of transaction tax compliance in a plurality of jurisdictions for a plurality of entities. The service engine generates and/or transmits tax compliance data which may include information about potential lack of tax compliance of an entity in various jurisdictions based on rules about establishing nexus for purposes of remitting transaction tax in the jurisdictions. The tax compliance data may include a notification about the generation of the information, such as a notification to the entity that there exists a potential lack of tax compliance of that entity in specific jurisdictions. The service engine may update the tax compliance data dynamically and send corresponding notifications, automatically in real time or near real time for the applicable entity as sales of the entity change and/or rules for establishing nexus change for various jurisdictions.

8 Claims, 11 Drawing Sheets

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |
| 7,945,536 B2 | 5/2011 | Bao et al. |
| 8,099,342 B1 | 1/2012 | Christian et al. |
| 8,386,344 B2 | 2/2013 | Christian et al. |
| 8,458,337 B2 | 6/2013 | Corley et al. |
| 8,526,405 B2 | 9/2013 | Curtis et al. |
| 8,528,047 B2 | 9/2013 | Terzis et al. |
| 8,613,044 B2 | 12/2013 | Casey et al. |
| 8,620,578 B1 | 12/2013 | Brown et al. |
| 8,725,407 B2 | 5/2014 | Hurley et al. |
| 8,751,399 B2 | 6/2014 | Kolhatkar et al. |
| 8,849,862 B2 | 9/2014 | Scott |
| 8,904,493 B1 | 12/2014 | Dibble |
| 9,101,834 B2 | 8/2015 | Letourneau et al. |
| 9,342,367 B2 | 5/2016 | Koneti et al. |
| 9,613,190 B2 | 4/2017 | Ford et al. |
| 9,760,915 B2 | 9/2017 | Pavlou et al. |
| 9,762,553 B2 | 9/2017 | Ford et al. |
| 10,033,702 B2 | 7/2018 | Ford et al. |
| 10,332,216 B2 | 6/2019 | Barsade et al. |
| 10,445,818 B1 | 10/2019 | Chowdhary |
| 10,572,684 B2 | 2/2020 | Lafever et al. |
| 10,572,953 B1 | 2/2020 | Char et al. |
| 10,614,130 B1 | 4/2020 | Pai et al. |
| 10,628,582 B2 | 4/2020 | Reybok et al. |
| 10,764,254 B2 | 9/2020 | Ford et al. |
| 10,769,611 B2 | 9/2020 | McNeel |
| 10,789,590 B2 | 9/2020 | Tran et al. |
| 10,872,100 B1 | 12/2020 | Shefferman et al. |
| 11,176,620 B1 | 11/2021 | Lubczynski et al. |
| 11,238,542 B1 | 2/2022 | Wixted et al. |
| 11,475,430 B2 | 10/2022 | Burton et al. |
| 11,514,448 B1 | 11/2022 | Liberman |
| 2002/0138765 A1 | 9/2002 | Fishman et al. |
| 2003/0055754 A1 | 3/2003 | Sullivan |
| 2003/0093320 A1* | 5/2003 | Sullivan .............. G06Q 40/02 705/19 |
| 2003/0101112 A1 | 5/2003 | Gallagher et al. |
| 2003/0144931 A1 | 7/2003 | Stokes et al. |
| 2006/0085275 A1* | 4/2006 | Stokes ................ G06Q 40/02 705/27.1 |
| 2006/0235776 A1 | 10/2006 | Temme |
| 2006/0282900 A1 | 12/2006 | Johnson et al. |
| 2007/0073892 A1 | 3/2007 | Laurila et al. |
| 2007/0124294 A1 | 5/2007 | Sun et al. |
| 2007/0136158 A1 | 6/2007 | Rawlings et al. |
| 2007/0136159 A1 | 6/2007 | Rawlings et al. |
| 2007/0136475 A1 | 6/2007 | Leppisaari et al. |
| 2007/0203718 A1 | 8/2007 | Merrifield, Jr. |
| 2007/0239464 A1 | 10/2007 | Carroll |
| 2008/0104124 A1 | 5/2008 | Bao et al. |
| 2008/0154754 A1 | 6/2008 | William et al. |
| 2009/0006467 A1 | 1/2009 | Scott |
| 2009/0024698 A1 | 1/2009 | Ho et al. |
| 2009/0067395 A1 | 3/2009 | Curtis et al. |
| 2009/0076965 A1 | 3/2009 | Elson et al. |
| 2009/0082008 A1 | 3/2009 | Thorell |
| 2009/0187500 A1 | 7/2009 | Wilson et al. |
| 2009/0279455 A1 | 11/2009 | Wang et al. |
| 2010/0095359 A1 | 4/2010 | Gordon |
| 2010/0211634 A1 | 8/2010 | Song et al. |
| 2011/0187864 A1 | 8/2011 | Snider |
| 2012/0011518 A1 | 1/2012 | Duan et al. |
| 2012/0179801 A1 | 7/2012 | Luna et al. |
| 2012/0239731 A1 | 9/2012 | Shyamsunder et al. |
| 2013/0013471 A1 | 1/2013 | Fishman |
| 2013/0061179 A1 | 3/2013 | Alletto et al. |
| 2013/0086380 A1 | 4/2013 | Krishnaswamy et al. |
| 2013/0191883 A1 | 7/2013 | Tung |
| 2013/0281115 A1 | 10/2013 | Dupray et al. |
| 2013/0290200 A1* | 10/2013 | Singhal .............. G06Q 10/0637 705/317 |
| 2013/0317944 A1 | 11/2013 | Huang et al. |
| 2013/0346608 A1 | 12/2013 | Tung |
| 2014/0094199 A1 | 4/2014 | Palanki et al. |
| 2014/0172526 A1 | 6/2014 | Arrocho et al. |
| 2014/0172656 A1 | 6/2014 | Shaw |
| 2014/0222524 A1 | 8/2014 | Pluschkell et al. |
| 2014/0289386 A1 | 9/2014 | Vatto et al. |
| 2014/0337189 A1 | 11/2014 | Barsade et al. |
| 2014/0351105 A1 | 11/2014 | Hamm |
| 2015/0019591 A1 | 1/2015 | Scott |
| 2015/0058931 A1 | 2/2015 | Miu et al. |
| 2015/0163206 A1 | 6/2015 | McCarthy et al. |
| 2015/0310188 A1 | 10/2015 | Ford et al. |
| 2016/0042466 A1 | 2/2016 | Herndon et al. |
| 2016/0062949 A1 | 3/2016 | Smith et al. |
| 2016/0099963 A1 | 4/2016 | Mahaffey et al. |
| 2016/0140668 A1 | 5/2016 | Maguire et al. |
| 2016/0179874 A1 | 6/2016 | Lynch |
| 2017/0041296 A1 | 2/2017 | Ford et al. |
| 2017/0140471 A1 | 5/2017 | Hemberg et al. |
| 2017/0142076 A1 | 5/2017 | Ford et al. |
| 2017/0272316 A1 | 9/2017 | Johnson et al. |
| 2017/0272485 A1 | 9/2017 | Gordon et al. |
| 2018/0096175 A1 | 4/2018 | Schmeling et al. |
| 2018/0150647 A1 | 5/2018 | Naqvi et al. |
| 2018/0246479 A1 | 8/2018 | Judd et al. |
| 2018/0367506 A1 | 12/2018 | Ford et al. |
| 2019/0114609 A1 | 4/2019 | Burton et al. |
| 2019/0222560 A1 | 7/2019 | Ford et al. |
| 2019/0332807 A1 | 10/2019 | Lafever et al. |
| 2020/0328951 A1 | 10/2020 | Ramprakash |
| 2020/0349572 A1 | 11/2020 | O'Sullivan et al. |
| 2020/0356974 A1 | 11/2020 | McNeel |
| 2020/0387896 A1 | 12/2020 | Tran et al. |
| 2021/0082051 A1 | 3/2021 | Moses |
| 2021/0158456 A1 | 5/2021 | Morgan et al. |
| 2021/0233181 A1 | 7/2021 | Bubalo et al. |

OTHER PUBLICATIONS

"The Seller's Guide to eCommerce Sales Tax," TaxJar, Jun. 18, 2019, https://www.taxjar.com/guides/intro-to-sales-tax/, 19 pages.

Yetter, "Sales Tax Institute helps you understand sales and use tax obligations," YouTube Video, Dec. 15, 2011, URL=https://www.youtube.com/watch?v=gKFe1W062Ok&feature=emb_logo, download date Sep. 10, 2019, 1 page. (Screenshot).

"How do I know if I should be collecting tax in a state?" Sales Tax Institute, Aug. 12, 2017, https://www.salestaxinstitute.com/sales_tax_faqs/should_i_collect_tax, 2 pages.

"What is Nexus?" Sales Tax Institute, Aug. 26, 2019, https://www.salestaxinstitute.com/sales_tax_faqs/what_is_nexus, 6 pages.

"Sales Tax Nexus Guide", taxconnex, Whitepaper Download, 2019, 18 pages.

Ellen Wixted et al., "Online Interactive Notification Platform for Exploring Possible Tax Nexus and Implications," U.S. Appl. No. 16/775,771, filed Jan. 29, 2020. (111 pages).

Stefan Kim et al., "Disestablishing Entity's Selected Resource Computation in Response to Loss of Nexus Establishment Condition for Selected Domain," U.S. Appl. No. 16/834,934, filed Mar. 30, 2020. (63 pages).

Nikki Nash et al., "Automatically Starting Activities Upon Crossing Threshold," U.S. Appl. No. 17/338,220, filed Jun. 3, 2021. (107 pages).

U.S. Appl. No. 16/775,771, filed Jan. 29, 2020.

U.S. Appl. No. 16/834,934, filed Mar. 30, 2020.

U.S. Appl. No. 17/338,220, filed Jun. 3, 2021.

Maccarrone, "The Impact of the U.S. Supreme Court's Decision in *South Dakota* v. *Wayfair*," 2021, retrieved from https://www.cpajournal.com/2021/04/26/the-impace-of-the-u-s-supreme-courts-decision-in-south-dakota-v-wayfair/, 11 pages.

Morgan et al., "Assembling Parameters to Compute Taxes for Cross-Border Sales," U.S. Appl. No. 16/696,062, filed Nov. 26, 2019, 75 pages.

Smith, "Due Process Implications Related to State Notice and Economic Nexus Laws," *Tax Lawyer* 70(4):833-868, 2017.

Deseir, "Digital Transformation Challenges In Large and Complex Organizations", 2018.

(56) References Cited

OTHER PUBLICATIONS

International Preliminary Report on Patentability received for PCT Patent Application No. PCT/US2021/040168, dated Jan. 12, 2023, 9 pages.
International Search Report and Written Opinion received for PCT Patent Application No. PCT/US2021/040168, dated Oct. 22, 2021, 10 pages.
Pichan et al., "Cloud Forensics: Technical Challenges, solutions, and comparative analysis", Digital Investigation, vol. 13, Jun. 2015, pp. 38-57.
Seth Therrien et al., "Tax Nexus Notification Platform," U.S. Appl. No. 16/585,829, filed Sep. 27, 2019. (72 pages).
Hu et al., "Game Theoretic Analysis for Offense—Defense Challenges of Algorithm Contests on TopCoder", 2015 IEEE Symposium on Science Oriented System Engineering Mar. 2015, IEEE Publiishing.

* cited by examiner

NEXUS NOTIFICATION PLATFORM

SUMMARY

When businesses sell, or buy goods, they are required by law to compute the amounts of money they may owe as taxes to various tax jurisdictions, and then remit these amounts to the tax jurisdictions. If they fail to accurately report and remit taxes, they may be subject to audits and fines—and ignorance of the law is not an excuse.

Businesses generally collect information relating to their operations, such as by using enterprise resource planning ("ERP") software applications and accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on. ERP applications, accounting applications, ecommerce applications and other conventionally used applications fail to provide accurate, reliable per-jurisdiction tax compliance information in a timely and efficient manner according to the various different rules in various different tax jurisdictions.

To solve the above technical problems, disclosed herein is a method comprising: updating, by a computer system, stored rules for a certain one of a plurality of tax jurisdictions, the stored rules being about establishing nexus for purposes of remitting transaction tax in the certain tax jurisdiction; comparing, by the computer system, stored information about goods or services sold by an entity in the certain tax jurisdiction against the updated stored rules for the certain tax jurisdiction; generating, by the computer system, information regarding potential lack of tax compliance of the entity for the certain tax jurisdiction based on the comparison; and transmitting, by the computer system over a network, to a client computing device associated with the entity, a notification about the generation of the information.

Also, disclosed herein is a system comprising at least one processor and a memory coupled to the at least one processor. The memory stores instructions that, when executed by the at least one processor, cause the system to perform operations comprising: updating, by a computer system, stored rules for a certain one of a plurality of tax jurisdictions, the stored rules being about establishing nexus for purposes of remitting transaction tax in the certain tax jurisdiction; comparing, by the computer system, stored information about goods or services sold by an entity in the certain tax jurisdiction against the updated stored rules for the certain tax jurisdiction; generating, by the computer system, information regarding potential lack of tax compliance of the entity for the certain tax jurisdiction based on the comparison; and transmitting, by the computer system, to a client computing device associated with the entity over a network a notification about the generation of the information.

Also disclosed herein is a non-transitory computer-readable storage medium having computer-executable instructions stored thereon that, when executed by at least one processor, cause the at least one processor to perform operations comprising: updating, by a computer system, stored rules for a certain one of a plurality of tax jurisdictions, the stored rules being about establishing nexus for purposes of remitting transaction tax in the certain tax jurisdiction; comparing, by the computer system, stored information about goods or services sold by an entity in the certain tax jurisdiction against the updated stored rules for the certain tax jurisdiction; generating, by the computer system, information regarding potential lack of tax compliance of the entity for the certain tax jurisdiction based on the comparison; and transmitting, by the computer system, to a client computing device associated with the entity over a network a notification about the generation of the information.

Also disclosed herein is a method comprising: electronically accessing, by a computer system, information about goods or services sold by a plurality of entities; determining, by the computer system, for each entity of the plurality of entities, whether there exists a potential lack of transaction tax compliance of the entity in each tax jurisdiction of a plurality of tax jurisdictions based on the accessed information; and for each entity of the plurality of entities for which it is determined by the computer system there exists potential lack of tax compliance in one or more of the plurality of tax jurisdictions, electronically notifying the entity regarding the potential lack of tax compliance.

Also disclosed herein is another system comprising at least one processor and a memory coupled to the at least one processor. The memory stores instructions that, when executed by the at least one processor, cause the system to perform operations comprising: electronically accessing information about goods or services sold by a plurality of entities; determining for each entity of the plurality of entities, whether there exists a potential lack of transaction tax compliance of the entity in each tax jurisdiction of a plurality of tax jurisdictions based on the accessed information; and for each entity of the plurality of entities for which it is determined by a computer system there exists potential lack of tax compliance in one or more of the plurality of tax jurisdictions, electronically notifying the entity regarding the potential lack of tax compliance.

Also disclosed herein is a non-transitory computer-readable storage medium having computer-executable instructions stored thereon that, when executed by at least one processor, cause a system to perform operations comprising: electronically accessing information about goods or services sold by a plurality of entities; determining, for each entity of the plurality of entities, whether there exists a potential lack of transaction tax compliance of the entity in each tax jurisdiction of a plurality of tax jurisdictions based on the accessed information; and for each entity of the plurality of entities for which it is determined by a computer system there exists potential lack of tax compliance in one or more of the plurality of tax jurisdictions, electronically notifying the entity regarding the potential lack of tax compliance.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
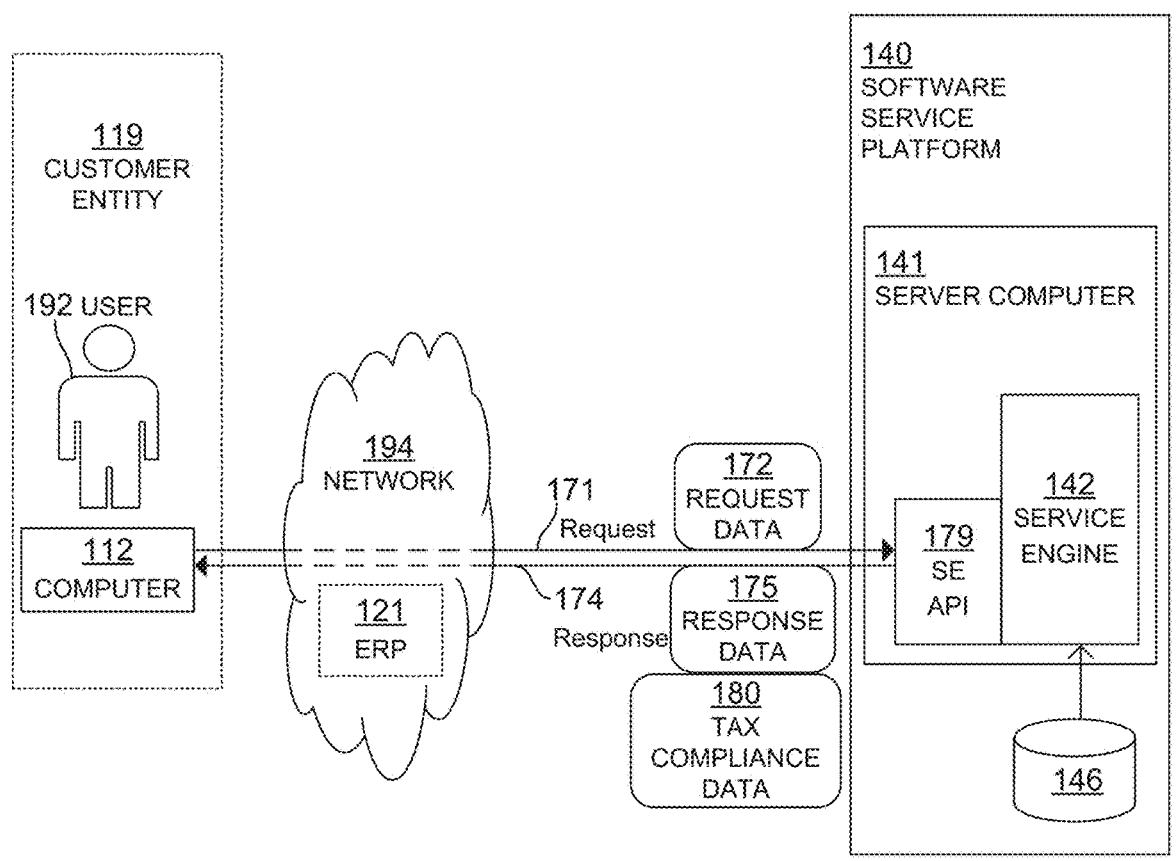
FIG. 1 is a block diagram showing an example configuration of a system, according to various embodiments of the present disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

There are many types of taxes for businesses. Such taxes include sales tax, use tax, excise tax, value-added tax, industry-specific taxes, cross-border taxes, and so on (collectively referred to herein as "transaction taxes"). Further, for a single transaction, taxes may be due to more than one tax jurisdiction, such as different states, localities within the states, counties, cities, municipalities, etc.

Determining the taxes due is often very complex. There are over 10,000 tax jurisdictions in the US, and almost 10 million taxability rules related to various products and services. Complexities in determining the sales tax due may arise from the location of the buyer, the seller, a distributor, etc. For example, some state and local authorities tax have origin-based rules, which means that a sales tax is charged from the seller's location; other state and local authorities tax have destination-based rules, which means that a sales tax is charged from the buyer's location. Additional complexities arise from the fact that different tax jurisdictions charge different percentage rates. These different tax jurisdictions can be different states, counties, cities, municipalities, special taxing jurisdictions, and so on.

In addition to calculating the cost of the tax, sellers of goods and services are subjected to many requirements about the taxes they must collect and remit. In particular, a seller must determine whether, and when, they must collect and remit transaction taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state. In the U.S., retailers must have some kind of presence in a state before that state can require that retailer to collect and remit sales tax from buyers in that state. With the Supreme Court ruling in the South Dakota v. Wayfair case, not only does physical presence (such as a location, employee or inventory), but "economic" presence in a state may create sales tax nexus. In other words, due to the Wayfair ruling, even if a retailer does not have a physical presence in a state, if the retailer passes a state's economic threshold, for example, for total revenue or number of transactions in that state, the retailer is legally obligated to collect and remit sales tax to that state. However, different states have different thresholds for determining whether there is an economic nexus, which provides a problem for retailers in determining whether they are compliant with the tax rules in various jurisdictions, especially when the retailers have ever changing total revenue and numbers of transactions in various different jurisdictions. Determining tax compliance under such circumstances for multiple retailers in various different jurisdictions according to the various different rules for the different tax jurisdictions and communicating such information to the retailers or other entities in real-time or near real time as transactions are occurring and nexus rules are changing presents a technical problem in order to do so in a timely and efficient manner over computer networks and in a way that integrates well into existing technical environments in which tax assistance is provided. The present disclosure provides systems and methods that solve this technical problem by increasing the speed, efficiency and accuracy of such specialized software platforms and computer networks.

FIG. 1 is a block diagram showing an example configuration of a system 100 working with a new service engine 142 that generates tax compliance data 180, according to various embodiments of the present disclosure.

A sample customer entity 119 includes a computer 112, and a user 192 who may use computer 112. Both could be located within a physical site of the customer entity 119, but that is not necessary. More details about computer 112 are provided with reference to FIG. 2.

In this example, a network 194 is a communications network. Network 194 can be any type of network, such as a local area network (LAN), a metropolitan area network (MAN), a wide area network (WAN), or the internet. In some embodiments, network 194 is considered to be the cloud. An Enterprise Resource Planning (ERP) system 121 may also be within network 194, if it is the cloud, or accessible by computer 112 via network 194.

In this example, a software service platform 140 is implemented by a server computer 141 and a database 146 storing data. Software service platform 140 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service, and so on.

Server computer 141 is configured, by software, to implement a service engine 142. Service engine 142 is configured to perform a predefined service. The service can be a computation, a search, a verification, a registration, a payment, a notification, generation of specialized information and so on. According to various embodiments of the present disclosure, the service may be determining or generating information about potential lack of tax compliance of customer entity 119 in various jurisdictions based on rules about establishing nexus for purposes of remitting transaction tax in the jurisdictions and/or transmitting a notification about the generation of the information. In some embodiments, the transmission of such information may alert the customer entity 119 of the potential lack of tax compliance. The tax compliance data 180 may be or include such information about potential lack of tax compliance.

In the context of FIG. 1, user 192 desires the service, and may even pay for it. User 192 uses computer 112 to access network 194 and, from network 194, to access software service platform 140. It will be appreciated that, in some contexts, service engine 142 performs cloud computing and is provided as software as a service (SaaS). Moreover, computer 112 can be viewed as a client computer from the perspective of software service platform 140.

The service of service engine 142 can be performed responsive to service engine 142 being properly invoked. While being performed, the service may use data from database 146.

Server computer 141 further hosts a service engine (SE) Application Programming Interface (API) 179. In some embodiments, SE API 179 is configured to invoke service engine 142 to perform its service, when properly requested. In various embodiments, service engine 142 may perform its service without invocation by SE API 179. For example, service engine 142 may also or instead automatically invoke itself to perform the applicable service periodically and/or in response to one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 119 that are associated with a certain tax jurisdiction; a detected change or update to a volume of sales transactions of the customer entity 119 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 119.

SE API 179 is configured to receive a request 171, which is shown as an arrow. Request 171 may be transmitted via network 194. Request 171 may have been ultimately caused to be generated by computer 112, for example as operated by user 192. In some embodiments, request 171 is transmitted via network 194 directly to SE API 179. In other embodiments, computer 112 causes ERP system 121 to transmit request 171. In yet other embodiments, ERP system 121 originates request 171 on behalf of customer entity 119.

Request 171 may also include associated request data 172. When SE API 179 receives request 171 with its request data 172, it invokes service engine 142. When thus invoked, service engine 142 may perform its service using request data 172. In response, SE API 179 can be configured to transmit a response 174, also shown as an arrow. Response 174 may include response data 175 that arises out of the service, such as a computed result, a confirmation, and so on. Response 174 can be transmitted back to the sender of request 171, or as otherwise directed. In some embodiments, the request 171 may be automatically generated and transmitted, such as by the ERP system 121 and/or computer 112 in response to one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 119 that are associated with a certain tax jurisdiction; a detected change or update to a volume of sales transactions of the customer entity 119 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 119.

In response to such a request being automatically generated, or in response to the service engine 142 invoking itself, the service engine 142 may generate and/or transmit tax compliance data 180. For example, tax compliance data 180 may be or include information about potential lack of tax compliance of customer entity 119 in various jurisdictions based on rules about establishing nexus for purposes of remitting transaction tax in the jurisdictions and/or a notification about the generation of the information. In an example embodiment, the tax compliance data 180 may be or include an alert or other notification that alerts the customer entity 119 entity of the potential lack of tax compliance. In some embodiments, the tax compliance data 180 may be used to update information regarding the potential lack of tax compliance for a certain tax jurisdiction within an account associated with the customer entity 119. The account associated with the customer entity 119 may be accessible by the customer entity 119 via a client computing device, for example, the computer 112, wherein the updated information regarding the potential lack of tax compliance is for display on a user interface associated with the account. Such a user interface may, in various embodiments, be a user interface of the server computer 141, computer 112, and/or a computer in ERP system 121, and so on. Furthermore, the account associated with the customer entity 119 may be managed, stored and/or accessible by the server computer 141, computer 112, and/or a computer in ERP system 121, and so on.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1, which may be known to some, are provided near the end of this description, for not interrupting the flow of this description at this stage.

Figure 2:
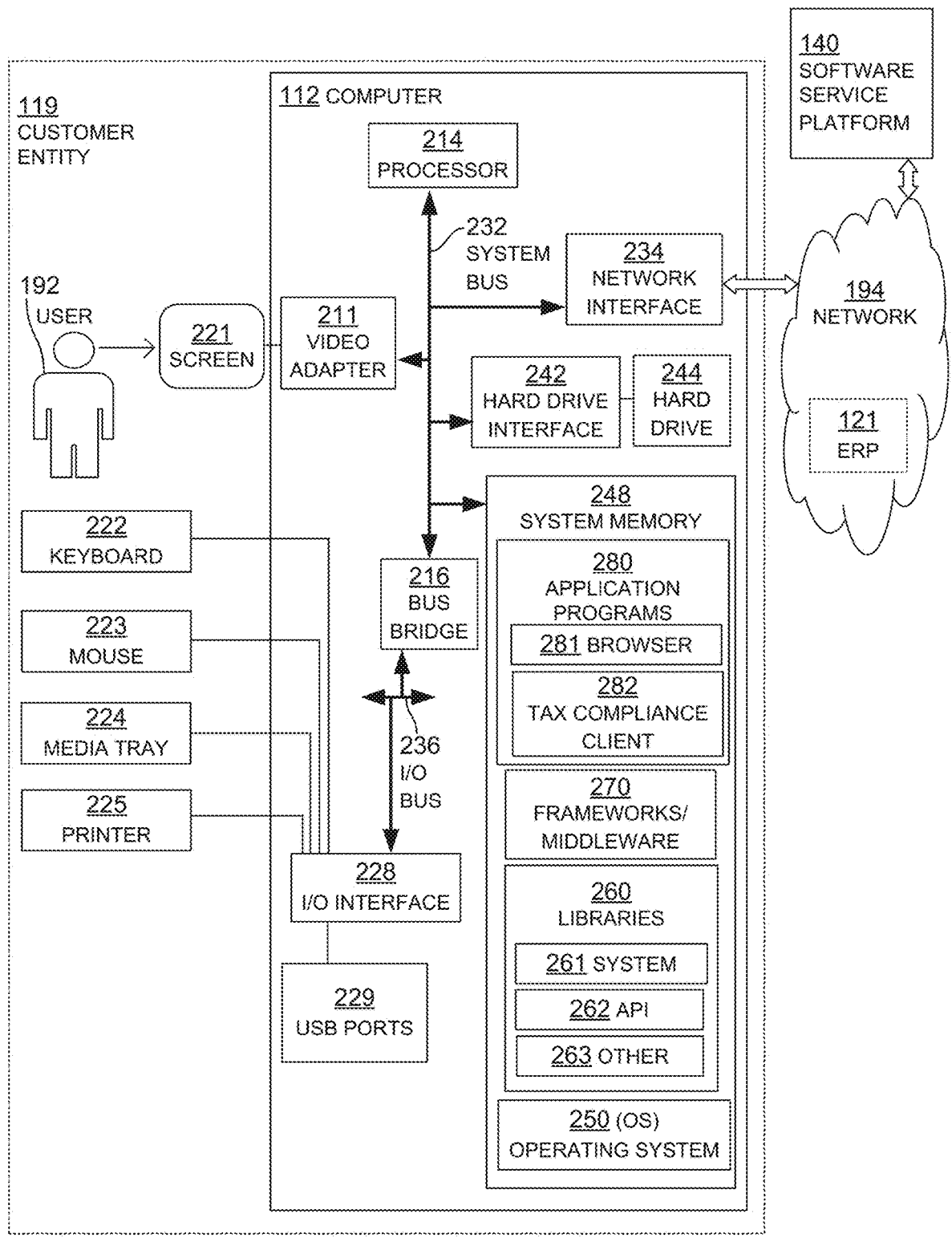
FIG. 2 is a block diagram showing more details of a computer of an example customer entity of FIG. 1, with reference to the communication network and the software service platform, according to various embodiments of the present disclosure.

FIG. 2 is a block diagram showing more details of a computer 112 of an example customer entity 119 of FIG. 1, with reference to the communication network 194 and the software service platform 140, according to various embodiments of the present disclosure.

FIG. 2 shows customer entity 119 of FIG. 1, along with more sample details for computer 112. Computer 112 may be a desktop computer, a laptop computer, a tablet computer, a mobile phone, and so on.

Computer 112 includes a processor 214. Computer 112 also includes a system bus 232 that is coupled to processor 214. System bus 232 can be used by processor 214 to control and/or communicate with other components of computer 112.

Computer 112 additionally includes a network interface 234 that is coupled to system bus 232. Network interface 234 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on. Network interface 234 can access network 194.

Also shown is a tax compliance client 282 residing in system memory 248, which may comprise computer-executable instructions executed by processor 214 to invoke or otherwise obtain services of the software service platform 140 provided by the service engine 142 running on server computer 141 of the software service platform 140. For example, the tax compliance client 282 may obtain and/or invoke the software service platform 140 to generate and/or transmit tax compliance data 180. In some embodiments, the tax compliance client 282 may generate a user interface for and/or provide access to an account associated with the customer entity 119 through which the tax compliance data 180 for the customer entity 119 may be accessible by the customer entity 119 via the computer 112. For example, updated information regarding the potential lack of tax compliance of the customer entity 119 may be displayed via the tax compliance client 282 on a user interface associated with the account and/or the tax compliance client 282. The tax compliance client 282 may, in various embodiments, be part of or integrated with the browser 281. In other embodiments, the browser 281 may be or perform the operations of the tax compliance client 282, for example, when the software service platform 140 provides web-based services.

In some embodiments, the tax compliance client 282 may communicate and/or obtain services of ERP applications (e.g., ERP system 121), accounting applications, ecommerce applications and/or other applications remote from or resident on the computer 112. For example, the tax compliance client 282 may cause ERP system 121 to transmit a request or other information to the software service platform 140 that invokes services of the software service platform 140 to be provided to the tax compliance client 282 and/or ERP system 121. For example, such information may include information indicative of one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 119 that are associated with a certain tax jurisdiction; a detected change or update to a volume of sales transactions of the customer entity 119 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 119. As another example, the tax compliance client 282 may request, or cause ERP system 121 to request, transaction data regarding sales of the customer entity 119 from the ERP system 121, accounting applications, ecommerce applications and/or other applications for purposes of transmitting such transaction data to the software service platform 140, such that the software service platform 140 can use such data to determine potential lack of tax compliance in various jurisdictions for the customer entity 119. In yet other embodiments, ERP system 121 originates transmitting a request or transmitting of other information on behalf of customer entity 119.

Additional details about FIG. 2 are provided near the end of this description, for not interrupting the flow of this description at this stage.

Figure 3:
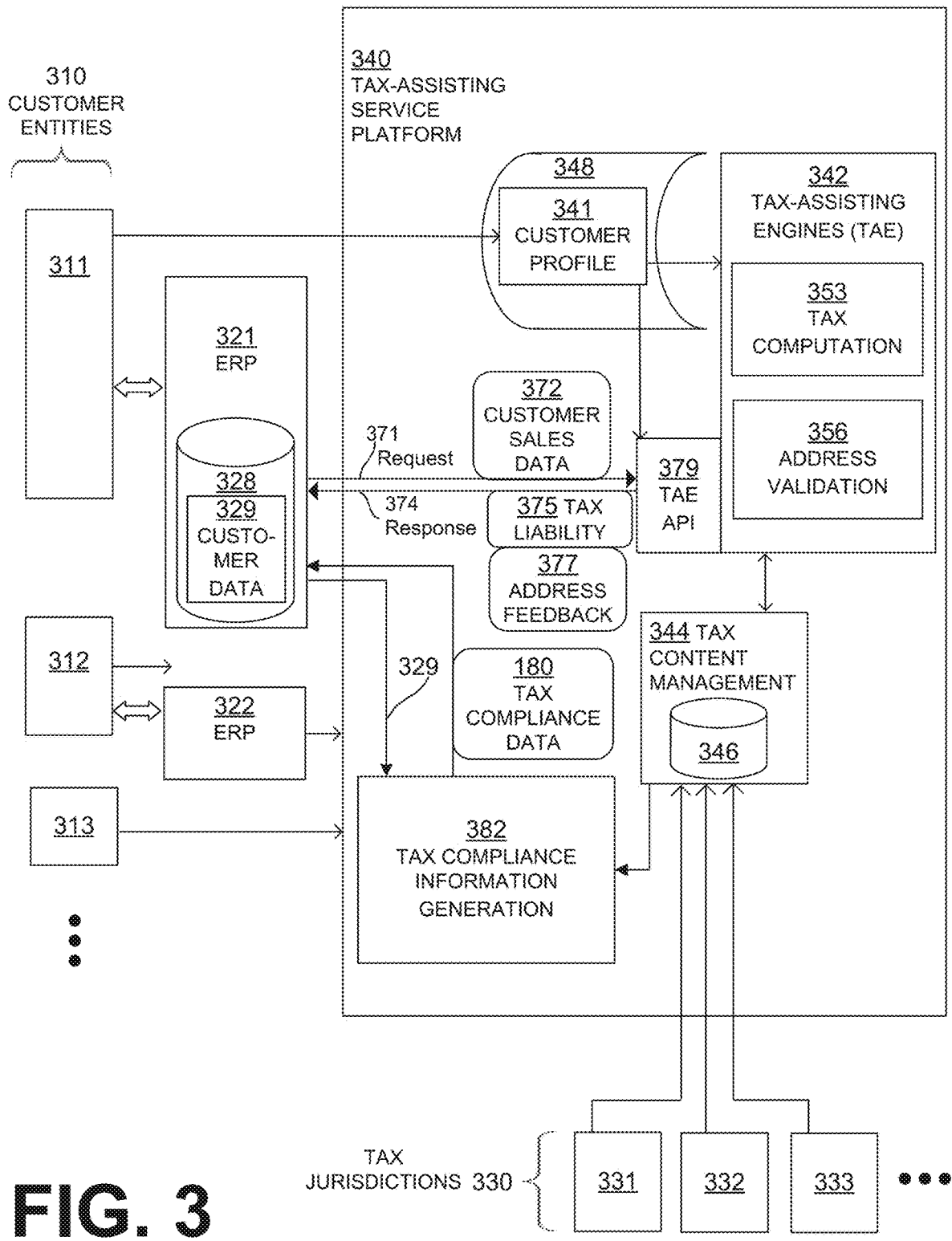
FIG. 3 is a block diagram showing an example software architecture working with a tax compliance information generation engine, according to various embodiments of the present disclosure.

FIG. 3 is a block diagram showing an example software architecture working with a tax compliance information generation engine 382, according to various embodiments of the present disclosure.

In this example, a software-implemented tax-assisting service platform 340 is configured to provide tax-related services. These services may include determining potential lack of tax compliance in various different jurisdictions for the customer entities 310, generating information regarding potential lack of tax compliance of the entity for the various tax jurisdictions, and/or transmitting one or more notifications about the generation of the information. For example, such a notification may be a notification to a particular customer entity 311 that there is a potential lack of tax compliance of that customer entity 311 in a certain tax jurisdiction. In some embodiments, these services may also include performing tax calculations and performing address validation for customer entities 310. Any one of sample customer entities 311, 312, 313, . . . may be as described for customer entity 119. These customer entities 310 may access a software-implemented tax-assisting service platform 340, for receiving its tax-related services.

Aspects of FIG. 3 may be implemented by components described and shown elsewhere in this document, for example with reference to FIG. 1 and FIG. 2. For instance, in some embodiments, customer entities 310 access tax-assisting service platform 340 fully directly, for example as is shown for customer entity 313. In other embodiments, this accessing is performed at least in part indirectly, for example by using Enterprise Resource Planning (ERP) systems 321, 322. In this example, ERP system 321 has a database 328 that stores customer data 329 of customer entity 311, such as sales data or other transaction data. For example, such sales data may be used by the tax compliance information generation engine 382 data to determine potential lack of tax compliance in various tax jurisdictions 330 for the customer entities 310. In this example, tax-assisting service platform 340 includes a database 348, and customer entity 311 has stored their own customer profile 341 in database 348.

Tax-assisting service platform 340 includes a tax content management component 344 for use by TAE 342 and the tax compliance information generation engine 382. Tax content management component 344 may receive tax information from one or more tax jurisdictions 330, such as sample tax jurisdictions 331, 332, 333, . . . . Tax content management component 344 includes a database 346 for storing the received tax information in the form of tax rules, rates, exemptions, etc. For example, the database 346 may store rules about establishing nexus for purposes of remitting transaction tax in the various tax jurisdictions 330. In some embodiments, such rules are rules about meeting or exceeding one or more thresholds regarding sales over a period of time.

Tax-assisting service platform 340 includes tax-assisting engines 342. In some embodiments, TAE 342 includes a tax computation engine 353, and even an address validation engine 356.

In this example, tax-assisting engines 342 may be invoked via a TAE Application Programming Interface (API) 379. Only one TAE API 379 is shown implemented here, while multiple ones may be implemented instead, for example one for invoking each of tax computation engine 353 and address validation engine 356. In this example, TAE API 379 is configured to receive a request 371 or other information from ERP 321. Request 371 has data 372 of customer entity 311. Data 372 may be looked up from customer data 329 in database 328. In various embodiments, data 372 may also or instead be transmitted to one or more of the tax-assisting engines 342 in response to a request from the respective tax-assisting engine. In some embodiments, data 372 may also or instead be pushed to one or more of the tax-assisting engines 342 from one or more of the customer entities 310 and/or ERP system 321, such as in response to the customer data 329 being updated or changed, or on a periodic basis. In response to receiving request 371 with its data 372, TAE API 379 invokes one of tax-assisting engines 342 to perform its service. Then, TAE API 379 is configured to transmit a response 374. Response 374 can be transmitted back to the sender of request 371, or otherwise.

In some embodiments, customer data 329 may be pushed to the tax compliance information generation engine 382 from one or more of the customer entities 310 and/or ERP system 321, such as in response to the customer data 329 being updated or changed, or on a periodic basis. In response to receiving this information the tax compliance information generation engine 382 may perform its service and send the tax compliance data 180. the tax compliance data 180 may be transmitted back to the sender of the customer data 329, to a corresponding customer entity 310, or otherwise. In various embodiments, the tax compliance information generation engine 382 may also or instead automatically invoke itself to perform the applicable service in response to one or more various conditions being satisfied, including, but not limited to, one or more of: a detected change or update to stored rules about establishing nexus for purposes of remitting transaction tax in a certain tax jurisdiction of tax jurisdictions 330; a detected change or update to a monetary amount of sales, that are associated with a certain tax jurisdiction of tax jurisdictions 330, of one or more of the customer entities 310; a detected change or update to a volume of sales transactions, that are associated with a certain tax jurisdiction of tax jurisdictions 330, of one or more of the customer entities 310; one or more thresholds being met, within a predetermined threshold of being met, or being exceeded regarding sales associated with establishing nexus for purposes of one or more of the customer entities 310 remitting transaction tax in a certain tax jurisdiction of tax jurisdictions 330; and conditions indicated by stored preferences of one or more of the customer entities 310. For example, such stored rules, including the thresholds, may be stored in the database 346 of the tax content management component 344 and accessible by the tax compliance information generation engine 382. Also, records of the sales transactions for the customer entities 310 may comprise and/or be part of the customer data 329 and transmitted to the tax compliance information generation engine 382. The stored preferences of one or more of the customer entities 310 may also comprise and/or be part of the customer data 329 and transmitted to the tax compliance information generation engine 382.

In some embodiments, the customer data 329 may be automatically generated and/or transmitted to the tax compliance information generation engine 382, such as by the ERP system 321 and/or one or more of the customer entities 310 in response to one or more various conditions being satisfied, including, but not limited to, one or more of: a detected change or update to stored rules about establishing nexus for purposes of remitting transaction tax in a certain tax jurisdiction of tax jurisdictions 330; a detected change or update to a monetary amount of sales, that are associated with a certain tax jurisdiction of tax jurisdictions 330, of one or more of the customer entities 310; a detected change or update to a volume of sales transactions, that are associated with a certain tax jurisdiction of tax jurisdictions 330, of one or more of the customer entities 310; one or more thresholds being met, within a predetermined threshold of being met, or being exceeded regarding sales associated with establishing nexus for purposes of one or more of the customer entities 310 remitting transaction tax in a certain tax jurisdiction of tax jurisdictions 330; and conditions indicated by stored preferences of one or more of the customer entities 310.

In response to such the customer data 329 being automatically generated and/or transmitted to the tax compliance information generation engine 382, or in response to the tax compliance information generation engine 382 invoking itself when certain conditions are satisfied, the tax compliance information generation engine 382 may generate and/or transmit tax compliance data 180 based on received customer data 329. For example, tax compliance data 180 may be or include information about potential lack of tax compliance of one or more customer entities 310 in various jurisdictions 330 based on rules about establishing nexus for purposes of remitting transaction tax in the jurisdictions. Also, tax compliance data 180 may be or include a notification about the generation of the information. In an example embodiment, the tax compliance data 180 may be or include an alert or other notification that alerts one or more of the customer entities 310 of the potential lack of tax compliance in one or more of the tax jurisdictions 330. For example, the tax compliance information generation engine 382 may periodically, or upon the customer data 329 being updated, receive customer sales data that consists or is included in the customer data 329 regarding sales of customer entity 311 in one or more of tax jurisdictions 330. The tax compliance information generation engine 382 may then compare the sales data of the customer data 329 against rules stored in database 346 which are about establishing nexus for purposes of remitting transaction tax in each of the tax jurisdictions 330. If, for example, based on the sales data included in the customer data 329, the tax compliance information generation engine 382 determines that the volume of sales transactions of customer entity 311 meet, are within a predetermined threshold of meeting, or exceed a threshold indicated by the rules regarding establishing an economic nexus for tax jurisdiction 331, then the tax compliance information generation engine 382 may transmit a notification to customer entity 311 that there is a potential lack of tax compliance for customer entity 311 in tax jurisdiction 331. This notification may be, or be part of the tax compliance data 180. In various embodiments, the tax compliance information generation engine 382 may perform such a service based on monitoring updates to the rules stored in database 346 and monitoring the sales data of the customer data 329 for each of the customer entities 310 for each of the tax jurisdictions 330 without needing to receive a specific request for such a service.

In some embodiments, the tax compliance data 180 may be used to update information regarding the potential lack of tax compliance for one or more of the tax jurisdictions 330 within an account associated with the one or more customer entities 310. For example, an account associated with the customer entity 311 may be associated with or include customer profile 341 and accessible by the customer entity 311 via the tax-assisting service platform 340, wherein the updated information regarding the potential lack of tax compliance is for display on a user interface associated with the account. Furthermore, the account associated with the customer entity 311 may be managed, stored and/or accessible by the customer entity 311, the tax-assisting service platform 340, and/or the ERP system 321.

If tax computation engine 353 is invoked by request 371, it may calculate a tax liability of an amount of tax due, based on data 372. In that case, response 374 includes a component of a tax liability 375 that indicates the calculated amount.

If address validation engine 356 is thus invoked by request 371, it may perform an address-validation process, based on data 372. In that case, response 374 includes a component of an address feedback 377. The latter can be a message that an address is valid, or not, or propose a different address.

In some embodiments, tax-assisting service platform 340 may perform a variety of services in addition to what is described above. For one example, tax-assisting service platform 340 may accumulate and store customer sales data 372.

In another example, tax-assisting engines 342 and/or the tax compliance information generation engine 382 may further include one or more additional engines and/or functional components than are shown in the example of FIG. 3. Such additional engines and/or functional components, upon being invoked, can perform additional tax-related services, such as: a) register one or more of customers 310 with one or more appropriate tax jurisdictions 330, b) generate tax returns, i.e., prepare forms for filing by customer entities 310, c) file electronically such returns with the appropriate ones of tax jurisdiction(s) 330, and so on. In some embodiments, one or more of such services may be performed by the TAE 342 and/or the tax compliance information generation engine 382 for one or more of the customer entities 310, or a notification may be transmitted to one or more of the customer entities 310 that such services are available or recommended, in response to a determination by the tax compliance information generation engine 382 that there exists a potential lack of tax compliance for the one or more of the customer entities 310.

Figure 4:
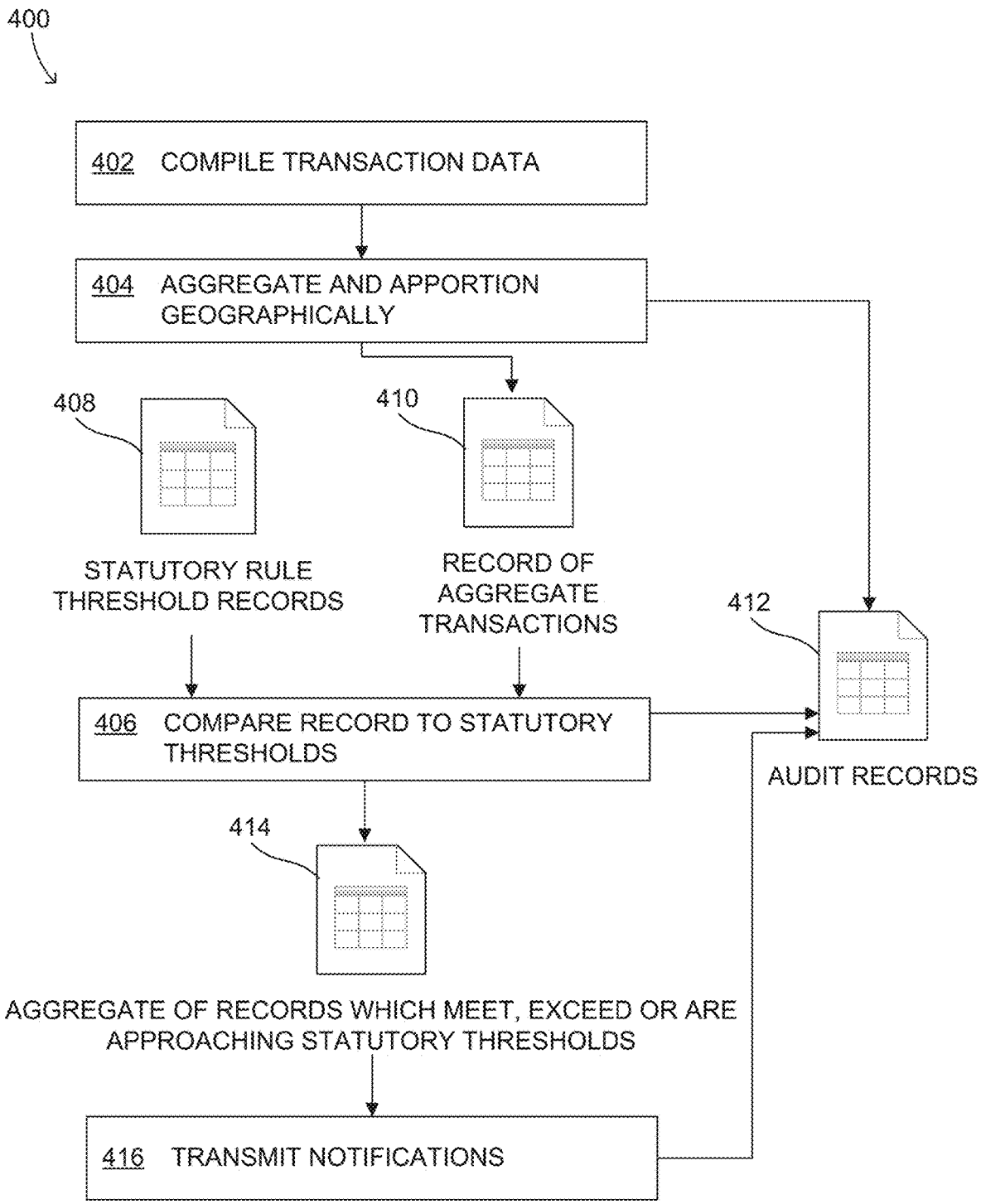
FIG. 4 is a flow diagram of an example process and corresponding data flow for transmitting notifications about information regarding potential lack of tax compliance, according to various embodiments of the present disclosure.

FIG. 4 is a flow diagram of an example process 400 and corresponding data flow for transmitting notifications about information regarding potential lack of tax compliance, according to various embodiments of the present disclosure.

At 402, the tax compliance information generation engine 382 of FIG. 3 may compile transaction data of customer entities, such as customer entities 310 of FIG. 3. For example, such transaction data may include data representing, for each of the customer entities 310, a monetary amount of sales (e.g., revenue) associated with one or more of the tax jurisdictions 330 and/or a volume of sales transactions (e.g., number of sales transactions) associated with one or more of the tax jurisdictions 330. The tax compliance information generation engine 382 may compile such data from one or more sources, including, but not limited to, data customer data 329 from database 328 and/or ERP system 322 of FIG. 3.

At 404, the tax compliance information generation engine 382 may aggregate and apportion geographically the compiled transaction data to produce a record of aggregate transactions 410. For example, to produce the record of aggregate transactions 410, all sales made by customer entity 311 of FIG. 3 over a specific period of time to purchasers in Texas may be apportioned to Texas for customer entity 311 and all sales made by customer entity 312 of FIG. 3 over a specific period of time to purchasers in Rhode Island may be apportioned to Rhode Island for customer entity 312. Such data may be organized by total revenue and/or total transactions geographically per jurisdiction and per customer entity. Such data may also be organized according to other criteria, including, but not limited to: type of goods, products or services sold; exempt goods, products or services; date of transaction; evaluation period; location goods shipped to; location of seller; location of buyer and type of transaction. The tax compliance information generation engine 382 may change the compiling, including organization, of such data based on corresponding changing rules, about establishing nexus for purposes of remitting transaction tax in the plurality of tax jurisdictions 330. Such rules may include economic nexus requirements, for each jurisdiction and the tax compliance information generation engine 382 may monitor such changes in the rules for each jurisdiction and update the rules accordingly. For example, the tax compliance information generation engine 382 may access the rules from one or more sources, including, but not limited to, tax jurisdictions 330 of FIG. 3. Such rules and corresponding updates may be stored in database 346.

At 406 the tax compliance information generation engine 382 may compare the record of aggregate transactions 410 for one or more customer entities 330 to updated rules about establishing nexus for purposes of remitting transaction tax in the plurality of tax jurisdictions, which may include statutory rule threshold records 408 that include rules regarding a monetary amount of sales that are associated with each of various tax jurisdictions and/or a volume of sales transactions that are associated with each of various tax jurisdictions. Below are some examples of such rules for a sample group of individual tax jurisdictions in the U.S.

Idaho
    Effective date: Jun. 1, 2019
    Included transactions: Cumulative gross receipts from sales including taxable products and taxable services delivered into the state
    Treatment of exempt transactions: Exempt sales and exempt services are included in the threshold count
    Trigger: Sales only
    Sales/transactions threshold: $100,000
    Evaluation period: Threshold applies to the current or preceding calendar year.

New Mexico
    Effective date: Jul. 1, 2019
    Included transactions: Taxable gross receipts from taxable sales, taxable services, leases, and licenses of products, and sales of licenses and services of licenses for use of real property sourced to the state Treatment of exempt transactions: Exempt sales and exempt services are not included in the threshold count
Trigger: Sales only
Sales/transactions threshold: $100,000
Evaluation period: Threshold applies to the previous calendar year Rhode Island
Effective date: Jul. 1, 2019
Included transactions: Sales of tangible personal property, prewritten computer software, and vendor-hosted prewritten software delivered electronically or by load and leave, and/or taxable services
Treatment of exempt transactions: Exempt sales are included but exempt services are not included in the threshold count
Trigger: Sales or transactions
Sales/transactions threshold: $100,000 or 200 transactions
Evaluation period: Threshold applies to the preceding calendar year Texas
Effective date: Oct. 1, 2019
Included transactions: Sales of products and taxable services into the state
Treatment of exempt transactions: Exempt sales and exempt services are included in the threshold count
Trigger: Sales only
Sales/transactions threshold: $500,000
Evaluation period: Threshold applies to the previous 12-months, with the initial 12 calendar months beginning Jul. 1, 2018 through Jun. 30, 2019

Virginia
Effective date: Jul. 1, 2019
Included transactions: Gross revenue from retail sales and taxable services into the state
Treatment of exempt transactions: Exempt sales and exempt services are not included in the threshold count
Trigger: Sales or transactions
Sales/transactions threshold: $100,000 or 200 transactions
Evaluation period: Threshold applies to the current or previous calendar year For example, the tax compliance information generation engine 382 may find in the record of aggregate transactions 410 that customer entity 311 has total sales of $550,000 of products and taxable services into Texas in the 12 months beginning Jul. 1, 2018 through Jun. 30, 2019. The tax compliance information generation engine 382 may then search the statutory rule threshold records 408 and find that the statutory threshold for Texas is $500,000. The tax compliance information generation engine 382 may then compare the $550,000 in total sales into Texas for customer entity 311 to the statutory threshold for Texas of $500,000 and record that it exceeds this statutory threshold for Texas. The tax compliance information generation engine 382 may perform such comparisons for various different customer entities 310 for various different jurisdictions 330. For example, the tax compliance information generation engine 382 may find in the record of aggregate transactions 410 that customer entity 312 has a total of 185 transactions for sales of tangible personal property into Rhode Island in the preceding calendar year. The tax compliance information generation engine 382 may then search the statutory rule threshold records 408 and find that the statutory threshold for Rhode Island is $100,000 total sales or 200 transactions. The tax compliance information generation engine 382 may then compare the 185 total number of transactions apportioned to Rhode Island for customer entity 312 to the statutory threshold for Rhode Island of 200 transactions and record that it is approaching this statutory threshold for Rhode Island (e.g., within a threshold number of 20 transactions of the 200 transaction threshold). Other thresholds may be used to determine whether the statutory threshold is being approached and such thresholds may be selectable by the customer entity and/or the tax compliance information generation engine 382.

The comparison may include comparison of data representing various different other or additional criteria, which may, in some embodiments, be indicated by or otherwise based on the particular rules for specific jurisdictions including, but not limited to: type of goods, products or services sold; exempt goods, products or services; date of transaction; evaluation period; location goods shipped to; location of seller; location of buyer and type of transaction.

Based on such comparison, the tax compliance information generation engine 382 may determine which records of the record of aggregate transactions apportioned geographically include transactions that meet, are within a predetermined threshold of meeting, and/or exceed one or more thresholds regarding sales for one or more of the corresponding individual tax jurisdiction associated with the geographical area. For example, the tax compliance information generation engine 382 may generate an aggregate of records which meet, exceed or are approaching statutory thresholds 414 for each jurisdiction for each customer entity. Also, in some embodiments, the tax compliance information generation engine 382 may first check the statutory rule threshold records 408 and then compare against the record of aggregate transactions 410 to determine whether there are any records which meet, are within a predetermined threshold of meeting, and/or exceed one or more thresholds.

At 416, the tax compliance information generation engine 382 may then transmit corresponding notifications to each of the customer entities which, according to the aggregate of records, have transactions that meet, exceed or are approaching statutory thresholds for one or more of the corresponding individual tax jurisdiction. For example, the notification may indicate to the customer entity that there is a potential lack of tax compliance of the entity for the specific corresponding tax jurisdictions.

In the present example, the tax compliance information generation engine 382 may transmit a notification to customer entity 311 indicating that there is a potential lack of tax compliance in Texas based on the result of the comparison by the tax compliance information generation engine 382 that indicates customer entity 311 exceeds the statutory threshold of $500,000 in total sales for the preceding 12 month period in Texas. Also, the tax compliance information generation engine 382 may transmit a notification to customer entity 312 indicating that there is a potential lack of tax compliance approaching in Rhode Island based on the result of the comparison by the tax compliance information generation engine 382 that indicates customer entity 312 is approaching (e.g., within a threshold number of 20 transactions) the statutory threshold for Rhode Island for total number of transactions in the preceding calendar year.

Whether, when and how to receive notifications and which thresholds to use may be selectable by the individual customer entity and/or tax compliance information generation engine 382. In various embodiments, such selectable features may include selectable items for amounts for sales revenue, number of transactions, number of jurisdictions, specific jurisdictions, types of transactions, periods of time, time of year, time of month, "notice and report" thresholds, etc. For example, particular customer entity 311 may select to receive notifications when customer entity 311 is within a selectable $20,000 threshold of meeting any statutory threshold for any jurisdiction. Other customer entities may select to receive notifications only when the threshold for a particular jurisdiction is met or exceeded. Notifications may be transmitted or initiated by various electronic techniques, including, but not limited to: email, updates to user accounts, text messages, automated phone calls, chat messages, web-based messages, desktop computer alerts, pop-up messages or alerts, mobile device messages, mobile device applications, etc. In some embodiments, a message may be electronically initiated by the tax compliance information generation engine 382 to be sent by mail or courier to an address selected by the customer entity. In some embodiments, the notifications do not indicate there is a potential lack of tax liability, but just that there is a notification available for the customer entity and may include instructions or a link for receiving or otherwise accessing further information, including information regarding potential lack of tax compliance. In some embodiments, the notification regarding potential lack of tax compliance may include or provide access to a notification regarding a potential lack of tax compliance regarding reporting, collecting, and/or remitting transaction taxes for individual jurisdictions.

Such notifications may also include some or all of the results and underlying data involved in the comparison of the record of aggregate transactions 410 to updated rules, and which transactions of the customer entity caused the determination of potential lack of tax compliance. Additionally, audit records 412 of the aggregation and apportionment of transaction data 404, the comparison to statutory thresholds 406 and the transmission of notifications 416 may be generated and stored by the tax compliance information generation engine 382, and may also be accessible by the corresponding customer entities 310 and/or the ERP system 322.

Figure 5:
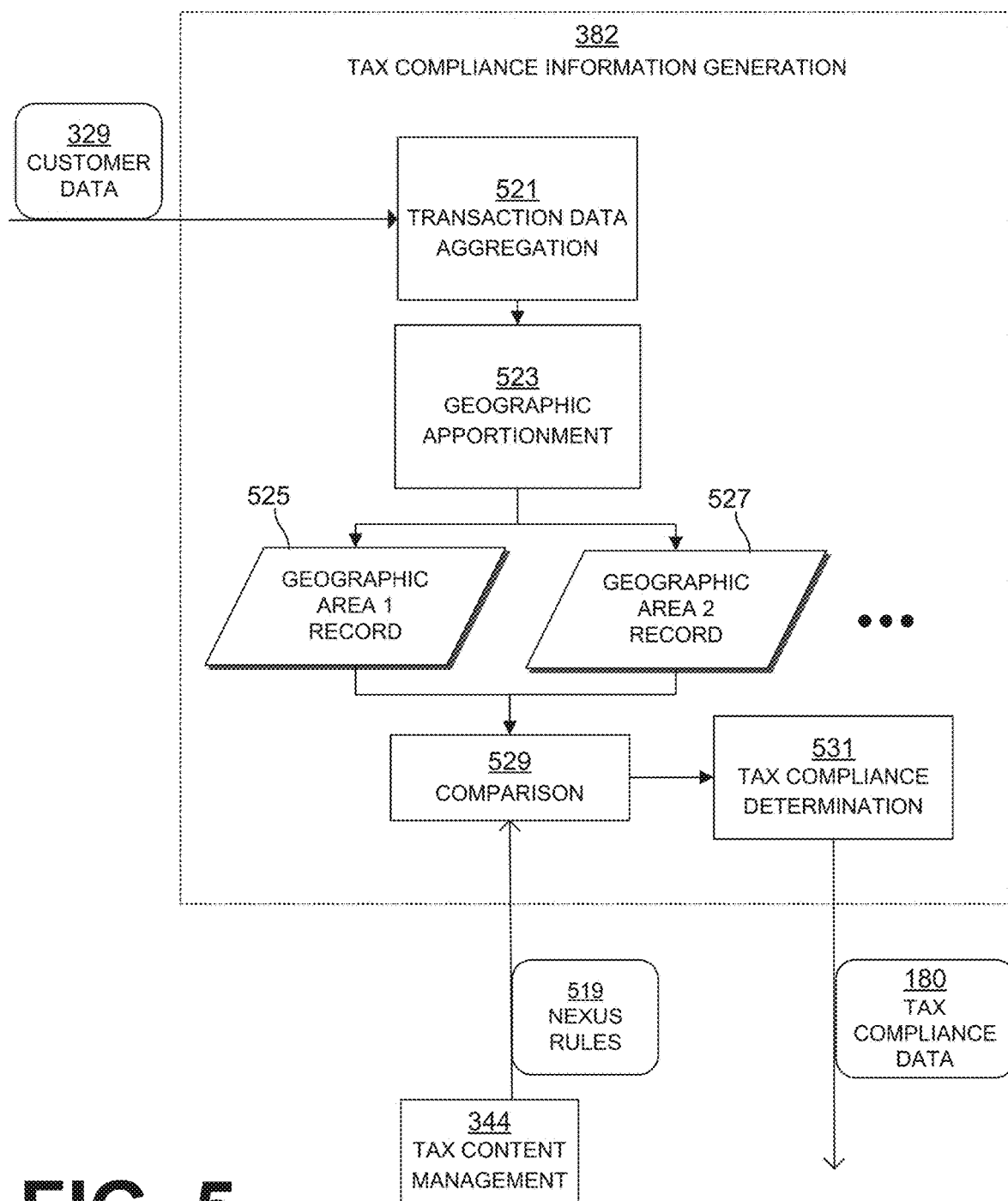
FIG. 5 is a block diagram showing more details of a tax compliance information generation engine of FIG. 3, according to various embodiments of the present disclosure.

FIG. 5 is a block diagram showing more details of a tax compliance information generation engine 382 of FIG. 3, according to various embodiments of the present disclosure.

Shown is a transaction data aggregation engine 521 that may receive the customer sales data 372. For example, the transaction data aggregation engine 521 may compile transaction data of customer entities from customer sales data 372, such as customer entities 310 of FIG. 3. For example, such transaction data may include data representing, for each of the customer entities 310, a monetary amount of sales (e.g., revenue) associated with one or more of the tax jurisdictions 330 and/or a volume of sales transactions (e.g., number of sales transactions) associated with one or more of the tax jurisdictions 330. Transaction data aggregation engine 521 may receive the customer sales data 372 and compile such data from one or more sources, including, but not limited to, data customer data 329 from database 328 and/or ERP system 322 of FIG. 3.

Shown coupled to the transaction data aggregation engine 521 is geographic apportionment engine 523 that may aggregate and apportion geographically the compiled transaction data from the transaction data aggregation engine 521 to produce a record of transactions apportioned to each geographic region, which may each correspond to one or more individual tax jurisdictions. For example, transactions of a particular customer entity that occurred in (e.g., are for products that were shipped to) or are otherwise associated with geographic area 1 according to the rules for establishing nexus for the tax jurisdiction associated with geographic area 1 may be assigned, grouped or otherwise apportioned to geographic area 1 record 525. Similarly, transactions of a particular customer entity that are associated with geographic area 2 according to the rules for establishing nexus for the tax jurisdiction associated with geographic area 2, may be assigned, grouped or otherwise apportioned to geographic area 2 record 527, and so on. For example, the geographic area 1 record 525, geographic area 2 record 527, etc., may comprise the record of aggregate transactions 410 of FIG. 4. In some embodiments, there may be a geographic area record of transactions in each tax jurisdiction in the U.S. (e.g., for each state of the U.S.) that has a requirement for establishing nexus for purposes of remitting transaction tax in that jurisdiction.

Shown as receiving the geographic apportionment records (e.g., geographic area 1 record 525, geographic area 2 record 527, etc.) from the geographic apportionment engine 523 is the comparison engine 529. The comparison engine 529 may compare the geographic apportionment records for one or more customer entities 310 to updated nexus rules 519 about establishing nexus for purposes of remitting transaction tax in the plurality of tax jurisdictions, which may include statutory rule threshold records from tax content management component 344. For example, the statutory rule threshold records from tax content management component 344 may include nexus rules 519 regarding a monetary amount of sales that are associated with each of various tax jurisdictions and/or a volume of sales transactions that are associated with each of various tax jurisdictions.

Shown coupled to the comparison engine 529 is the tax compliance determination engine 531. Based on such comparison made by the comparison engine 529, the tax compliance determination engine 531 may determine which records of the geographic apportionment records (e.g., geographic area 1 record 525, geographic area 2 record 527, etc.) include transactions that meet, are within a predetermined threshold of meeting, and/or exceed one or more thresholds regarding sales for the corresponding individual tax jurisdiction associated with the geographical area. For example, based on such comparison made by the comparison engine 529, the tax compliance determination engine 531 may find that the records of geographic area 1 record 525 for a particular customer entity exceed the threshold number of transactions in the applicable time period for the tax jurisdiction associated with geographic area 1. The tax compliance determination engine 531 may then determine there is a potential lack of tax compliance of the particular customer entity in the tax jurisdiction associated with geographic area 1 based on this finding. The tax compliance determination engine 531 may then generate tax compliance data 180, which, for example, may be, include, or reference notifications to individual customer entities indicating potential lack of tax compliance in various jurisdictions.

Figure 6:
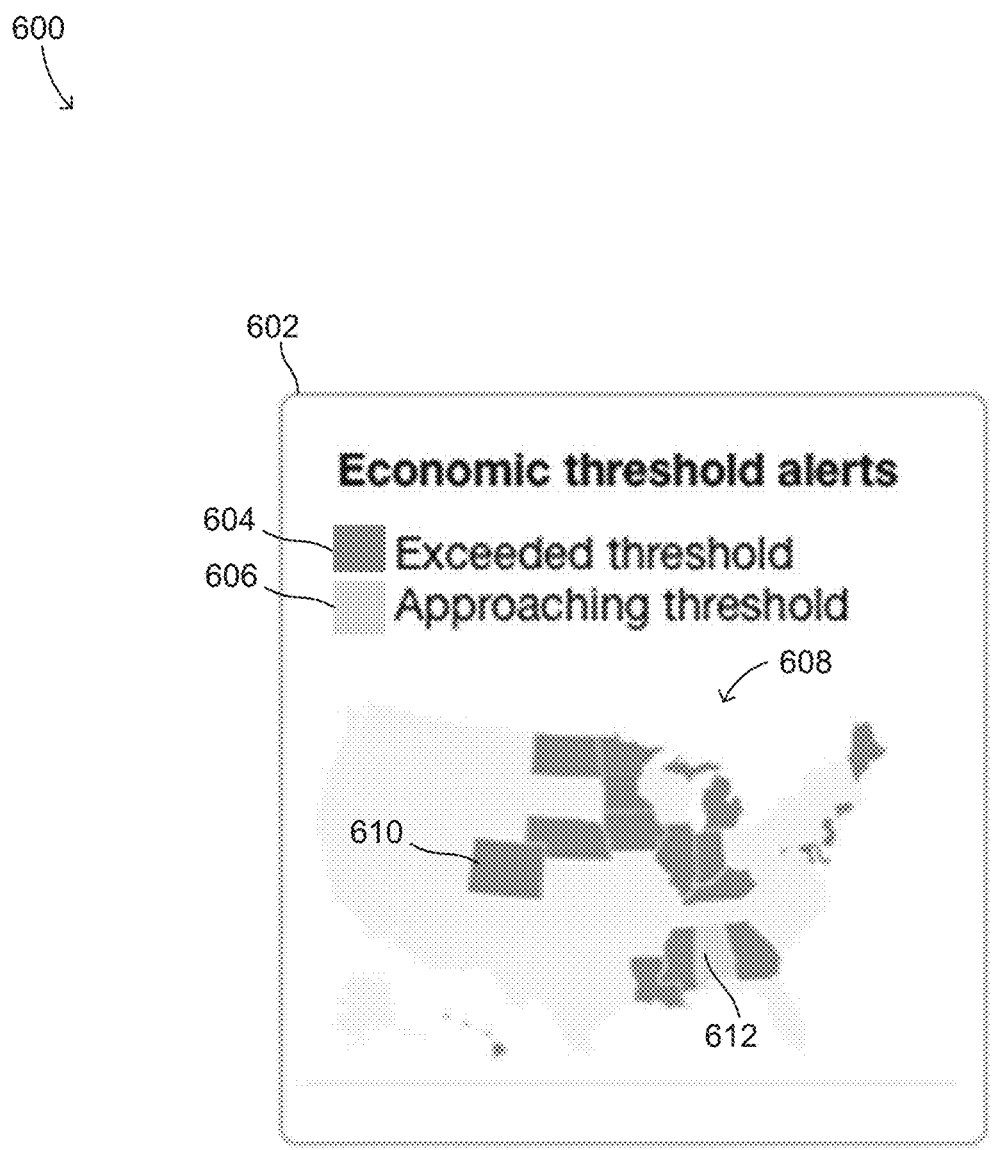
FIG. 6 depicts an example user interface showing example notifications about information regarding potential lack of tax compliance, according to various embodiments of the present disclosure.

FIG. 6 depicts an example user interface 600 showing example notifications about information regarding potential lack of tax compliance, according to various embodiments of the present disclosure.

User interface 600 includes a user interface screen 602 showing an example of information regarding potential lack of tax compliance of a particular customer entity (e.g., customer entity 313 of FIG. 3) for various tax jurisdictions. The user interface may include and/or represent tax compliance data 180. Shown is a map 608 of the U.S. having U.S. states highlighted in which the customer entity 313 has a potential lack of tax compliance, for example, as determined by the tax compliance determination engine 531 of the tax compliance information generation engine 382. In some embodiments, the states may be color coded or otherwise differently highlighted or marked to indicate whether a threshold for establishing nexus for purposes of remitting transaction tax in that state is being approached or has been exceeded. For example, the user interface screen 602 indicates that states for which the customer entity 313 has exceeded a threshold of that state for establishing nexus are colored dark gray 604 on the map 608. The user interface screen 602 indicates that states for which the customer entity 313 is approaching a threshold of that state for establishing nexus are colored light gray on the map 608.

In the example shown, among other states, the map 608 indicates, by coloring Colorado 610 dark gray 604, that customer 313 has exceeded the threshold of Colorado 610 for establishing nexus in that state. Also, the map 608 indicates, by coloring Alabama 612 light gray 606, that customer 313 is approaching the threshold of Alabama 612 for establishing nexus in that state. The user interface 602, including the map 608, may be updated dynamically, automatically and/or in real time or near real time by the tax compliance information generation engine 382 for the applicable customer entity as sales of the customer entity change and/or rules for establishing nexus change for various jurisdictions. The user interface 602, including the map 608, may be accessible in an account associated with the particular customer entity and/or, in some embodiments, comprise or be included in an electronic notification regarding potential lack of tax compliance to the customer entity. For example, the user interface 602, including the map 608, may comprise or be included in, one or more of: an email, updates to user accounts, text messages, chat messages, web-based messages, desktop computer alerts, pop-up messages or alerts, mobile device messages, mobile device applications, etc. In some embodiments, a message that includes or refers to a representation or reproduction of the user interface screen 602 may be electronically initiated by the tax compliance information generation engine 382 to be sent by mail or courier to an address selected by the particular customer entity.

The map 608 may also be interactive, for example, such that the user may click on or otherwise select one or more states and receive further information, options, actions and/or features pertaining to potential lack of tax compliance of the customer entity for that jurisdiction. For example, a user of the customer entity 313 may click on Colorado 610 and electronically receive or be presented with one or more of: information regarding rules for establishing nexus in Colorado; reasons for which there was a determination of potential lack of tax compliance in Colorado; which transactions of customer entity 313 caused the determination of potential lack of tax compliance in Colorado; steps to become tax compliant in Colorado; options to select for the TAE 342 and/or the tax compliance information generation engine 382 to perform for customer entity 313 to become tax compliant in Colorado; options to select for the TAE 342 and/or the tax compliance information generation engine 382 to initiate or perform registration with Colorado's taxing agency for collecting and/or remitting transaction taxes; options to select for the TAE 342 and/or the tax compliance information generation engine 382 to initiate or perform set up of internal processes for collecting sales tax in Colorado in accordance with the tax rules of that state; options to select for the TAE 342 and/or the tax compliance information generation engine 382 to initiate or perform keeping of records for the collected sales tax for Colorado; options to select for the TAE 342 and/or the tax compliance information generation engine 382 to initiate or perform filing of reports with Colorado; options to select for the TAE 342 and/or the tax compliance information generation engine 382 to initiate or perform paying or otherwise remitting of transaction taxes to Colorado; options to select for the TAE 342 and/or the tax compliance information generation engine 382 to initiate or perform requesting exemption certificates from tax exempt sellers for customer entity 313 in Colorado. In various embodiments, such operations may be performed by the TAE 342 and/or the tax compliance information generation engine 382 for various other particular jurisdictions and, at the selection of the particular customer entity, automatically in response to a determination by the tax compliance information generation engine 382 that there is a potential lack of tax compliance in the particular jurisdiction. For example, in response to the tax compliance information generation engine 382 determining that customer entity 313 has exceeded the threshold of Colorado 610 for establishing nexus in that state, the TAE 342 and/or the tax compliance information generation engine 382 may automatically perform or take steps to initiate performance of registration of customer entity 313 with Colorado's taxing agency for collecting and/or remitting transaction taxes and, in some embodiments, initiate or perform paying or otherwise remitting of transactions taxes to Colorado for customer entity 313.

Figure 7:
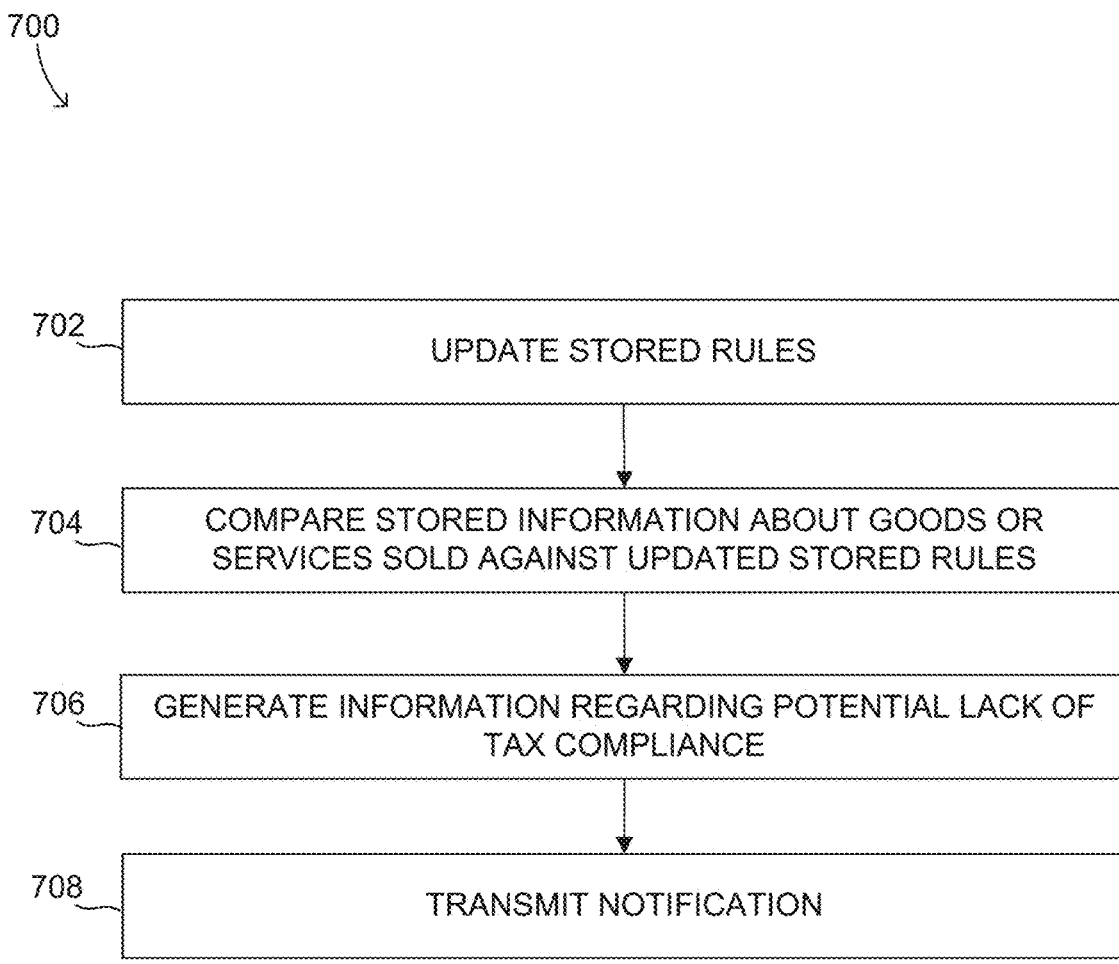
FIG. 7 is a flow diagram of an example process for generating information regarding potential lack of tax compliance of an entity and transmitting a corresponding notification, according to various embodiments of the present disclosure.

FIG. 7 is a flow diagram of an example process 700 for generating information regarding potential lack of tax compliance of an entity and transmitting a corresponding notification, according to various embodiments of the present disclosure.

At 702, the system 100 updates stored rules for a certain one of a plurality of tax jurisdictions. The stored rules may be about establishing nexus for purposes of remitting transaction tax in the certain tax jurisdiction. The system 100 may also monitor changes in rules for the plurality of tax jurisdictions and the updating the stored rules may be performed in response to the monitoring.

At 704, the system 100 compares stored information about goods or services sold by an entity in the certain tax jurisdiction against the updated stored rules for the certain tax jurisdiction. The comparing may include determining whether one or more thresholds regarding goods or services sold by the entity for establishing nexus for purposes of remitting transaction tax in the certain tax jurisdiction are met, are within a predetermined threshold of being met, or are exceeded. For example, the comparing may include comparing the stored information about goods or services sold by the entity to one or more thresholds regarding sales. The one or more thresholds regarding sales may be associated with requirements to remit transaction taxes for the certain tax jurisdiction.

In some embodiments, the comparing may be in response to the updating of the stored rules. The system 100 may detect a change in the stored information about goods or services sold by the entity. The comparing may then be in response to the detected change in the stored information about goods or services sold by the entity. In some embodiments, the change in the stored information about goods or services sold by the entity is a change detected in one or more of: a monetary amount of sales of the entity that are associated with the certain tax jurisdiction and a volume of sales transactions of the entity that are associated with the certain tax jurisdiction.

At 706, the system 100 generates information regarding potential lack of tax compliance of the entity for the certain tax jurisdiction based on the comparison. The system 100 may determine there is a potential lack of tax compliance of the entity in the certain tax jurisdiction if the one or more thresholds regarding sales associated with requirements to remit transaction taxes for the tax jurisdiction are met, are within a predetermined threshold of being met, or are exceeded.

At 708, the system transmits over a network, to a client computing device associated with the entity, a notification about the generation of the information. In some embodiments, the information is presented graphically and/or includes a map of the certain tax jurisdiction. The transmitting the notification about the generation of the information may include alerting the entity of potential lack of tax compliance by at least causing an indication of each of the plurality of tax jurisdictions for which there exists a potential lack of tax compliance of the entity to be presented on a map. The transmitting of the notification may, in some embodiments, include aggregating the determined records of the one or more records of aggregate transactions. For each determined record of the aggregated determined records, the system 100 may notify an entity associated with the determined record that there is a potential lack of tax compliance of the entity for one or more of the corresponding individual tax jurisdictions.

Figure 8:
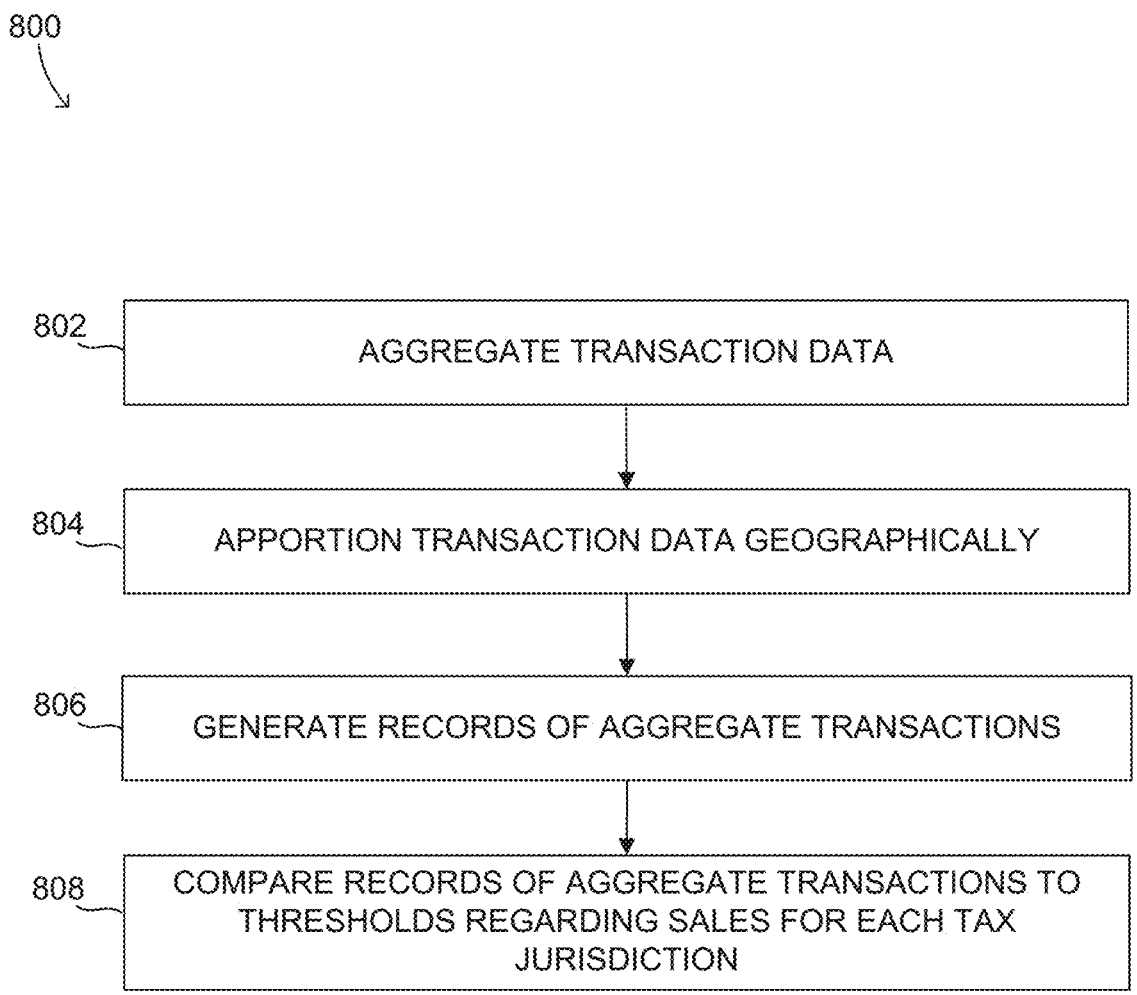
FIG. 8 is a flow diagram of an example process useful in generating information regarding potential lack of tax compliance, according to various embodiments of the present disclosure.

FIG. 8 is a flow diagram of an example process 800 useful in generating information regarding potential lack of tax compliance, according to various embodiments of the present disclosure. For example, comparing of stored information about goods or services sold by a plurality of entities against the stored rules about establishing nexus for purposes of remitting transaction tax in the plurality of tax jurisdictions may include the process 800.

At 802, the system 100 aggregates transaction data from the stored information about goods or services sold by the plurality of entities.

At 804, the system apportions the transaction data geographically to corresponding individual tax jurisdictions of the plurality of tax jurisdictions.

At 806, the system 100 generates one or more records of aggregate transactions based on the apportioning. The generating one or more records of aggregate transactions may include determining, based on the comparing, which records of the one or more records of aggregate transactions meet, are within a predetermined threshold of meeting, or exceed one or more thresholds regarding sales for one or more of the corresponding individual tax jurisdictions.

At 808, the system 100 compares the one or more records of aggregate transactions to one or more thresholds regarding sales for each of the corresponding individual tax jurisdictions based on the apportioning. The one or more thresholds may be regarding sales associated with establishing nexus for purposes of remitting transaction tax in the corresponding individual tax jurisdictions.

Figure 9:
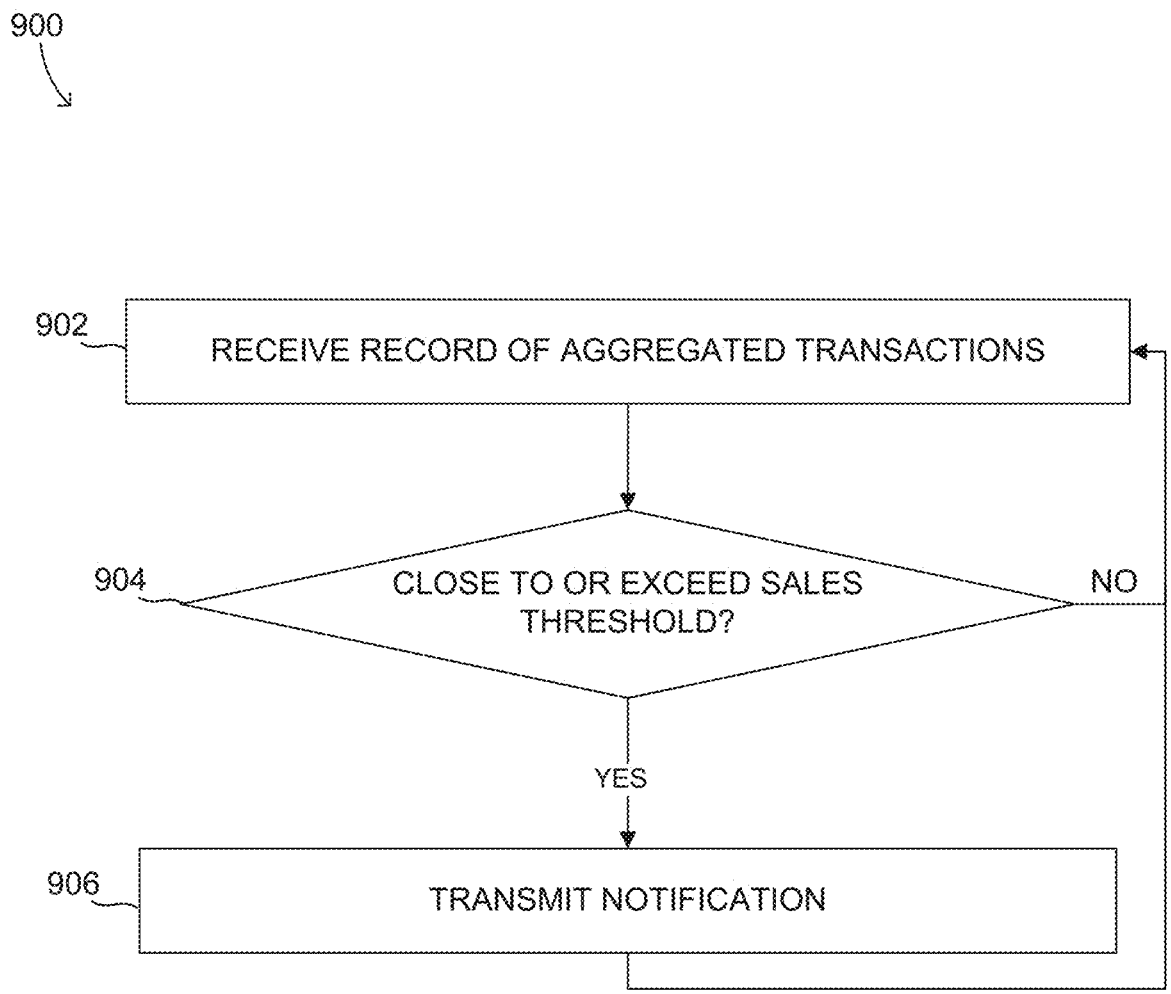
FIG. 9 is a flow diagram of an example process useful in determining for an entity whether there is a potential lack of tax compliance in a tax jurisdiction based on aggregated transactions, according to various embodiments of the present disclosure.

FIG. 9 is a flow diagram of an example process 900 useful in determining for an entity whether there is a potential lack of tax compliance in a tax jurisdiction based on aggregated transactions, according to various embodiments of the present disclosure.

At 902, the system 100 receives a record of aggregated transactions of a customer entity for a particular jurisdiction.

At 904, the system 100 determines whether the record of aggregated transactions for the jurisdiction meets, is within a predetermined threshold of meeting, or exceeds one or more thresholds regarding sales for the tax jurisdiction. For example, the system 100 may total the revenue received for all the transactions in the record and/or determine a total number of transactions over applicable periods of time and compare these totals to corresponding thresholds included in updated rules for establishing nexus for the tax jurisdiction to determine whether the corresponding totals meet, are within a predetermined threshold of meeting, or exceed the thresholds regarding sales for the tax jurisdiction.

If it is determined by the system 100 at 904 that the record of aggregated transactions for the jurisdiction does not meet, is not within a predetermined threshold of meeting and does not exceed the one or more thresholds regarding sales for the tax jurisdiction, then the process 900 proceeds back to 902 to receive a record of aggregated transactions of the particular customer entity for another jurisdiction. If it is determined at 904 that the record of aggregated transactions for the jurisdiction meets, is within a predetermined threshold of meeting, or exceeds one or more thresholds regarding sales for the tax jurisdiction, then the process 900 proceeds to 906.

At 906, the system 100 transmits a notification to the entity associated with that there is a potential lack of tax compliance of the entity for the particular tax jurisdiction and the process proceeds to 902 to receive a record of aggregated transactions of the customer entity for another jurisdiction. This notification may be transmitted in response to the determination by the system 100 at 904 that the record of aggregated transactions for the jurisdiction meets, is within a predetermined threshold of meeting, or exceeds one or more thresholds regarding sales for the tax jurisdiction.

Figure 10:
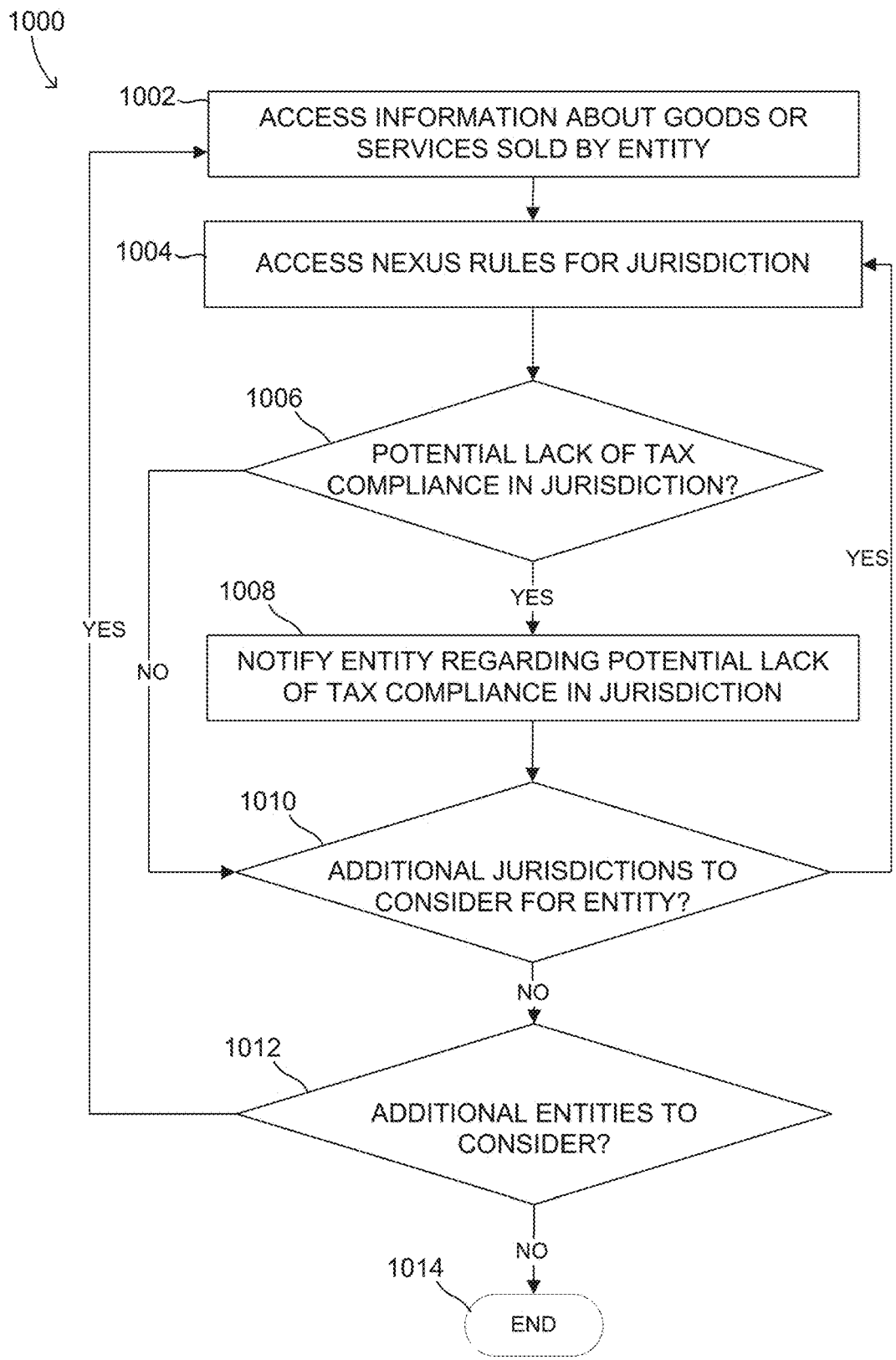
FIG. 10 is a flow diagram of an example process for notifying a plurality of entities whether there is a potential lack of tax compliance in a plurality of jurisdictions, according to various embodiments of the present disclosure.

FIG. 10 is a flow diagram of an example process 1000 for notifying a plurality of entities whether there is a potential lack of tax compliance in a plurality of jurisdictions, according to various embodiments of the present disclosure.

At 1002, the system 100 electronically accesses information about goods or services sold by a particular customer entity of a plurality of customer entities.

At 1004, the system 100, electronically accesses rules for establishing nexus for a particular tax jurisdiction of a plurality of tax jurisdictions.

At 1006, the system 100 determines whether there exists a potential lack of transaction tax compliance of the particular entity in the particular tax jurisdiction based on the accessed information. If it is determined by the system 100 that there exists a potential lack of transaction tax compliance of the particular entity in the particular tax jurisdiction based on the accessed information, the process 100 proceeds to 1008. If it is determined by the system 100 that there does not exist a potential lack of transaction tax compliance of the particular entity in the particular tax jurisdiction based on the accessed information, the process 100 proceeds to 1010.

At 1008, the system electronically notifies the entity regarding the potential lack of tax compliance.

At 1010, the system 100 determines whether there are additional tax jurisdictions to consider for the particular entity, such as if the entity has transactions associated with an additional tax jurisdiction that has rules for establishing nexus for purposes of remitting transaction tax in that additional jurisdiction. If it is determined by the system 100 that there are additional tax jurisdictions to consider for the particular entity, then the process proceeds to 1004 to access those particular rules for that additional jurisdiction. If it is determined by the system 100 that there are no additional tax jurisdictions to consider for the particular entity, then the process proceeds to 1012.

At 1012, the system 100 determines whether there are additional customer entities to consider, such as when there are additional customer entities that have transactions in one or more tax jurisdictions that have rules for establishing nexus for purposes of remitting transaction tax in that additional jurisdiction. If it is determined by the system 100 that there are additional customer entities to consider, then the process proceeds to 1002 to access information about goods or services sold by that additional customer entity in a particular tax jurisdiction. If it is determined by the system 100 that there are no additional customer entities to consider, then the process ends at 1014.

Figure 11:
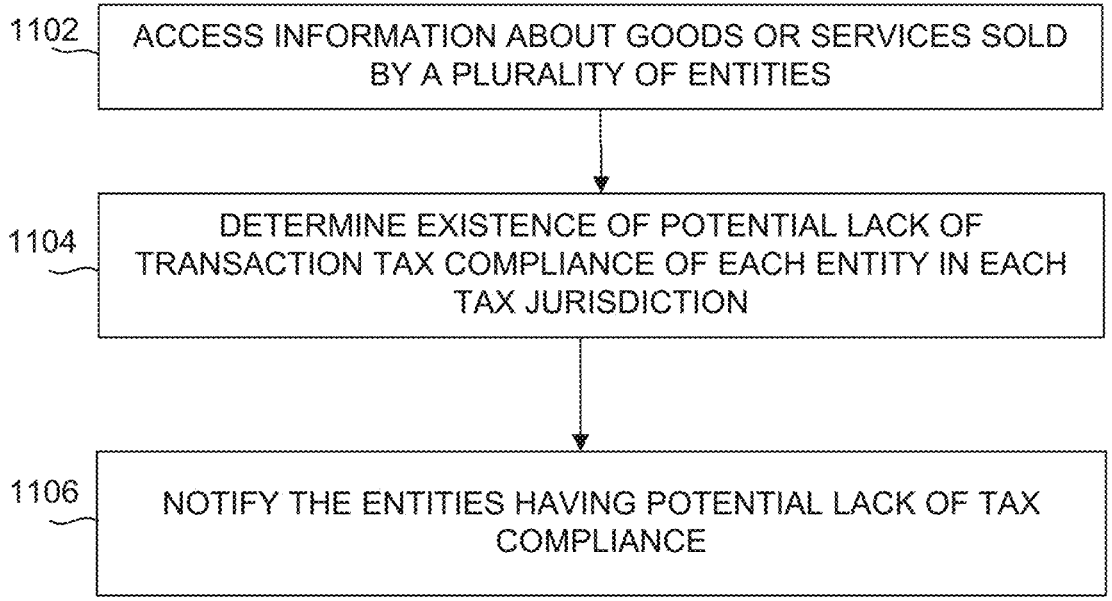
FIG. 11 is a flow diagram of another example process for notifying a plurality of entities whether there is a potential lack of tax compliance, according to various embodiments of the present disclosure.

FIG. 11 is a flow diagram of another example process 1100 for notifying a plurality of entities whether there is a potential lack of tax compliance, according to various embodiments of the present disclosure.

At 11002, the system 100 electronically accesses information about goods or services sold by a plurality of entities.

At 11004, the system 100 determines, for each entity of the plurality of entities, whether there exists a potential lack of transaction tax compliance of the entity in each tax jurisdiction of a plurality of tax jurisdictions based on the accessed information.

At 1106, the system 100, for each entity of the plurality of entities for which it is determined by the computer system there exists potential lack of tax compliance in one or more of the plurality of tax jurisdictions, electronically notifies the entity regarding the potential lack of tax compliance.

In some embodiments, the system 100 may also generate the information about goods or services sold by the plurality of entities. The system may perform this by, for each entity of the plurality of entities, performing per-transaction transaction tax calculations for the entity to facilitate the entity to execute sales transactions associated with one or more of the a plurality of tax jurisdictions for the goods or services. The determining whether there exists a potential lack of transaction tax compliance may include comparing the information about goods or services sold by the plurality of entities against stored rules for the plurality of tax jurisdictions. Such stored rules may be about establishing nexus for purposes of remitting transaction tax in a certain tax jurisdiction.

The comparing of the information about goods or services sold by the plurality of entities against stored rules for the plurality of tax jurisdictions may include aggregating transaction data from the information about goods or services sold by the plurality of entities; apportioning the transaction data geographically to corresponding individual tax jurisdictions of the plurality of tax jurisdictions; generating one or more records of aggregate transactions based on the apportioning; and comparing the one or more records of aggregate transactions to one or more thresholds regarding sales for each of the corresponding individual tax jurisdictions based on the apportioning. The one or more thresholds may be in regards to sales associated with establishing nexus for purposes of remitting transaction tax in the corresponding individual tax jurisdictions.

Additional details about FIG. 1 and FIG. 2 are now provided. Computer 112 further includes a video adapter 211, which is also coupled to system bus 232. Video adapter 211 may be able to drive and/or support a screen 221 that is used by user 192 together with computer 112.

In addition to screen 221, other peripheral input/output (I/O) devices that may be used together with computer 112 include a keyboard 222, a mouse 223, a media tray 224 and a printer 225. Media tray 224 may include storage devices such as CD-ROM drives, multi-media interfaces, and so on. Computer 112 moreover includes an I/O interface 228 connected to these peripheral I/O devices as shown, for the purpose of communicating with them. In this example these connections are direct. Alternately, one or more of these connections may take place via universal serial bus (USB) ports 229 of computer 112, to which I/O interface 228 is also connected.

Computer 112 moreover includes a bus bridge 216 coupled to system bus 232, and an input/output (I/O) bus 236. I/O bus 236 is coupled to bus bridge 216 and to I/O interface 228.

Computer 112 also includes various memory components. A non-volatile memory component is a hard drive 244. Computer 112 further includes a hard drive interface 242 that is coupled to hard drive 244 and system bus 232.

Additional memory components are in a system memory 248, which is also coupled to system bus 232. System memory includes volatile memory including, but not limited to, cache memory, registers and buffers. In embodiments, data from hard drive 244 populates registers of the volatile memory of system memory 248.

Sample system memory 248 has a software architecture that uses a stack of layers, with each layer providing a particular functionality. In this example the layers include—starting from the bottom—an operating system (OS) 250, libraries 260, frameworks/middleware 270 and application programs 280. Other software architectures may include less, more or different layers. For example, a presentation layer may also be included. For another example, some mobile or special purpose operating systems may not provide a frameworks/middleware 270.

OS 250 may manage hardware resources and provide common services. Libraries 260 provide a common infrastructure that is used by applications 280 and/or other components and/or layers. Libraries 260 provide functionality that allows other software components to perform tasks in a more easy fashion than to interface directly with the specific underlying functionality of OS 250. Libraries 260 may include system libraries 261, such as a C standard library. System libraries 261 may provide functions such as memory allocation functions, string manipulation functions, mathematical functions, and the like.

In addition, libraries 260 may include API libraries 262 and other libraries 263. API libraries 262 may include media libraries, such as libraries to support presentation and manipulation of various media formats such as MPREG4, H.264, MP3, AAC, AMR, JPG, and PNG. API libraries 262 may also include graphics libraries, for instance an OpenGL framework that may be used to render 2D and 3D in a graphic content on screen 221. API libraries 262 may further include database libraries, for instance SQLite, which may support various relational database functions. API libraries 262 may additionally include web libraries, for instance WebKit, which may support web browsing functionality.

Frameworks/middleware 270 may provide a higher-level common infrastructure that may be used by applications 280 and/or other software components/modules. For example, frameworks/middleware 270 may provide various graphic user interface (GUI) functions, high-level resource management, high-level location services, and so forth. Frameworks/middleware 270 may provide a broad spectrum of other APIs that may be used by applications 280 and/or other software components/modules, some of which may be specific to OS 250 or to a platform.

Application programs 280 are also known more simply as applications and apps. One such app is a browser 281. Browser 281 is an example of a renderer, which includes program modules and instructions that enable computer 112, to exchange network messages with network 194 using hypertext transfer protocol (HTTP) messaging.

Other such applications 280 may include a contacts application, a book reader application, a location application, a media application, a messaging application, and so on. Applications 280 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 280 may use built-in functions of OS 250, libraries 260, and frameworks/middleware 270 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors such as processor 214. Accordingly, these memory components are examples of machine-readable media.

In this context, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 214, as well as the processor of server computer 141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense The claimed invention is:

1. A method, comprising:
a cloud-based enterprise resource planning (ERP) system electronically receiving over a computer network a plurality of electronic requests, including respective request data of each of the electronic requests, from a plurality of remote network client devices of a specialized software platform that invokes electronic services of the software service platform to be provided to the plurality of remote network client devices over the computer network;
electronically integrating the cloud-based ERP system into a networked technical environment of the specialized software platform over the computer network by at least:
  electronically receiving, from the plurality of remote network client devices over the computer network, preferences regarding one or more conditions to be satisfied, the electronically receiving being performed in real-time as the conditions to be satisfied are changing and as the plurality of electronic requests are being received from the plurality of remote network client devices, in which the conditions to be satisfied are for invoking electronic services of a specialized service engine of a server computer of the specialized software platform;
  storing the preferences regarding one or more conditions to be satisfied for invoking electronic services in an electronic database that is accessible over the computer network to the cloud-based ERP system and accessible to the plurality of remote network client devices;
  the ERP system electronically determining whether the one or more conditions are satisfied;
  in response to the ERP system electronically determining whether one or more conditions are satisfied, the ERP system automatically transmitting the plurality of electronic requests, including the respective request data of each of the electronic requests, to an application programming interface (API) of the specialized service engine over the computer network;
  the API of the specialized service engine of the server computer electronically receiving the plurality of electronic requests from the ERP system in real-time as the electronic requests are being received by the ERP system;
  the specialized service engine of the server computer electronically compiling from the ERP system, via the API in electronic communication with the ERP system, additional data regarding the request data;
  the specialized service engine of the server computer performing cloud computing using two or more independent processors of two or more respective cloud based specialized service engines which execute instructions in parallel as a multi-core system to electronically aggregate the request data and the electronically compiled additional data in real-time as the plurality of requests are being received by the ERP from the plurality of remote network client devices and by the API from the ERP;
  electronically generating electronic records of aggregate data based on the request data and the electronically compiled additional data; and
  the specialized service engine of the server computer automatically determining, in real-time as the plurality of requests are being received by the ERP from the plurality of remote network client devices and by the API from the ERP, whether data values represented by the electronically generated records of aggregate data meet respective thresholds based on the electronically generated records of aggregate data;
  and the specialized software platform of the computer system electronically transmitting to the plurality of network client devices over the computer network, via the API, in real-time as the plurality of requests are being received by the ERP from the plurality of network client devices and by the API from the ERP, data regarding the automatic determinations.

2. The method of claim 1, wherein the electronically generating electronic records of aggregate data based on the request data and the electronically compiled additional data includes electronically generating records of geographic apportionment of aggregated data including the additional data for a plurality of geographical areas; and
  generating, by the specialized software platform, information regarding potential nexus of one or more entities associated with the plurality of remote network client devices for the plurality of geographical area based on the electronically generated records of geographic apportionment.

3. The method of claim 2, further comprising:
storing rules for additional ones of the plurality of geographical areas, the stored rules being about a nexus in one or more of the additional ones of the plurality of geographical areas, in which the nexus is based on one or more thresholds regarding the stored data of the entity;
comparing, by the computer system, the stored data of the entity against the stored rules for the additional ones of the plurality of geographical areas;
generating, by the computer system, information regarding potential nexus of an entity for each of the plurality of geographical areas based on the comparison; and
transmitting, by the computer system, to a client computing device over the network, a notification about the generation of the information regarding the potential nexus of the one or more entities for the plurality of geographical areas.

4. The method of claim 3, wherein the transmitting to the client computing device the notification about the generation of the information regarding the potential nexus of the one or more entities for the plurality of geographical areas includes:
  alerting the one or more entities of the potential nexus by at least causing an indication of each of the plurality of geographical areas for which there exists the potential nexus of the entity to be presented electronically on a map.

5. The method of claim 3, further comprising:
electronically receiving, by a particular service engine of a particular server computer of a computer network, from respective remote specialized enterprise resource planning (ERP) computer systems of a plurality of respective client computing devices, data of the plurality of respective client computing devices via a particular application programming interface (API) in electronic communication with the respective ERP computer systems;
in response to receiving the data of the plurality of respective client computing devices, electronically compiling, by the particular service engine of a server computer, the transaction data of the plurality of respective client computing devices by the service;

automatically aggregating, by the particular service engine of a server computer, the data of the plurality of respective client computing devices;

automatically apportioning, by the particular service engine of a server computer, the aggregated data geographically to corresponding individual geographical areas associated with particular data of the data of the plurality of respective client computing devices;

automatically generating, by the service engine of a server computer, one or more records of aggregate data based on the apportioning;

automatically generating, by the particular service engine of a server computer, respective geographic apportionment records for the plurality of respective client computing devices based on the one or more records of aggregate transaction data;

electronically receiving, by the service engine of a server computer of the computer network, from the plurality of respective client computing devices, preference data via the particular API in electronic communication with the plurality of respective client computing devices, wherein the preference data indicates a plurality of respective conditions of the plurality of respective client computing devices regarding the data of the plurality of respective client computing devices;

in response to receiving the preference data, automatically electronically storing the preference data in computer memory, by the particular service engine of a server computer of the computer network;

automatically detecting, by the client computing service engine of a server computer, one or more of the plurality of respective conditions of the plurality of respective client computing devices being satisfied;

automatically receiving, via the client computing API of the server computer, a respective plurality of requests in response to the automatic detection of the one or more of plurality of conditions being satisfied; and in response to receiving the plurality of requests via the client computing API, the client computing service engine of the server computer automatically invoking itself to perform:
electronically determining, by the client computing service engine of the server computer, an evaluation period associated with the stored rules; and
automatically determining, based on the one or more records of aggregate data and the respective geographic apportionment records, whether data values represented by the one or more records of aggregate transaction data over the evaluation period meet, are within a predetermined threshold of meeting or exceed a threshold indicated by the rules; and electronically transmitting over the computer network, by the particular service engine of the server computer, to each client computing device of the plurality of respective client computing devices, a notification regarding the determination, based on the one or more records of aggregate transaction data based and the respective geographic apportionment records, whether the data values represented by the one or more records of aggregate transaction data over the evaluation period meet, are within a predetermined threshold of meeting or exceed a threshold indicated by the rules.

6. The method of claim 5, wherein the comparing the stored data associated with the plurality of entities against the stored rules for the plurality of geographical areas includes:

aggregating data from the stored data associated with the plurality of entities;
apportioning the aggregated data geographically to corresponding individual geographical areas of the additional ones of the plurality of geographical areas;
generating one or more records of aggregate data based on the apportioning; and
comparing the one or more records of aggregate data to one or more thresholds regarding data for each of the corresponding individual geographical areas based on the apportioning.

7. The method of claim 6, wherein the generating information regarding potential nexus of the one or more entities for the plurality of geographical areas includes:
determining, based on the comparing, which records of the one or more records of aggregate data meet, are within a predetermined threshold of meeting, or exceed one or more thresholds regarding data for one or more of the corresponding individual geographical areas.

8. The method of claim 1, further comprising:
improving, by a computer system, efficiency of underlying computer networks in processing and transmitting specialized data to a disparate plurality of respective client computing devices associated with a plurality of entities by:
electronically receiving, by a particular service engine of a server computer of a computer network, from respective remote specialized enterprise resource planning (ERP) computer systems of a plurality of respective client computing devices, data of the plurality of respective client computing devices via a particular application programming interface (API) in electronic communication with the respective ERP computer systems;
in response to receiving the data of the plurality of respective client computing devices, electronically compiling, by the particular service engine of a server computer, the data of the plurality of respective client computing devices by the service;
automatically aggregating, by the particular service engine of a server computer, the data of the plurality of respective client computing devices;
automatically apportioning, by the particular service engine of a server computer, the aggregated data geographically to corresponding individual geographical areas associated with particular data of the data of the plurality of respective client computing devices;
automatically generating, by the particular service engine of a server computer, one or more records of aggregate data based on the apportioning;
automatically generating, by the particular service engine of a server computer, respective geographic apportionment records for the plurality of respective client computing devices based on the one or more records of aggregate data;
electronically receiving, by the particular service engine of a server computer of the computer network, from the plurality of respective client computing devices, preference data via the particular API in electronic communication with the plurality of respective client computing devices, wherein the preference data indicates a plurality of respective conditions of the of the plurality of respective client computing devices regarding the data of the plurality of respective client computing devices;

in response to receiving the preference data, automatically electronically storing the preference data in computer memory, by the particular service engine of a server computer of the computer network;

automatically detecting, by the particular service engine of a server computer, one or more of the plurality of respective conditions of the plurality of respective client computing devices being satisfied;

automatically receiving, via the particular API of the server computer, a respective plurality of requests in response to the automatic detection of the one or more of plurality of conditions being satisfied; and in response to receiving the plurality of requests via the API, the particular service engine of the server computer automatically invoking itself to perform:
electronically determining, by the particular service engine of the server computer, an evaluation period associated with stored rules; and
automatically determining, based on one or more records of aggregate data based and the respective geographic apportionment records, whether data values represented by the one or more records of aggregate data over the evaluation period meet, are within a predetermined threshold of meeting or exceed a threshold indicated by the rules; and electronically transmitting over the computer network, by the particular service engine of the server computer, to each client computing device of the plurality of respective client computing devices, a notification regarding the determination involving the data values, based on the one or more records of aggregate data and based on the respective geographic apportionment records, whether the data values represented by the one or more records of aggregate data over the evaluation period meet, are within a predetermined threshold of meeting or exceed a threshold indicated by the rules.

\* \* \* \* \*